United States Patent Office 3,716,365
Patented Feb. 13, 1973

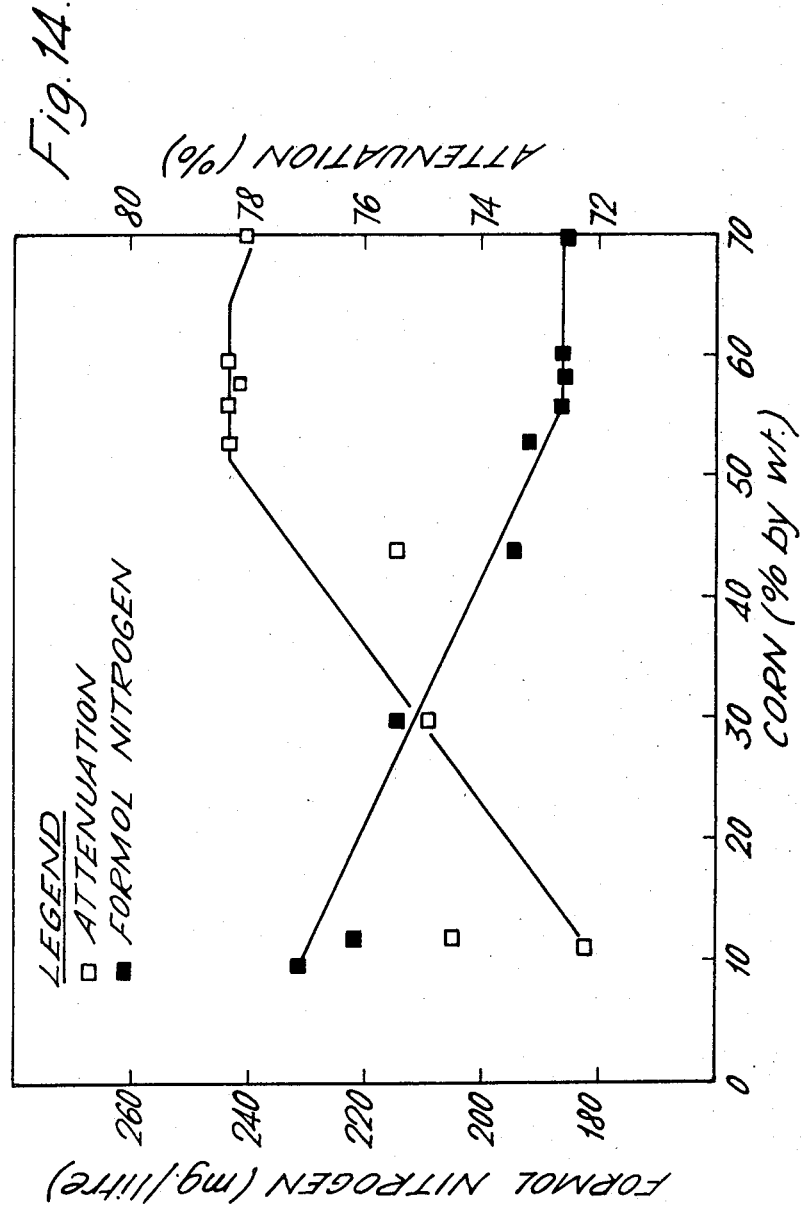

3,716,365
PROCESS FOR MAKING BREWERS' WORT
Martin F. Walmsley and John V. Cross, London, Ontario, Canada, assignors to John Labatt Limited, London, Ontario, Canada
Continuation-in-part of application Ser. No. 841,830, July 15, 1969. This application July 7, 1970, Ser. No. 52,999
Claims priority, application Great Britain, July 8, 1969, 34,409/69; July 21, 1969, 36,473/69, 36,474/69; July 23, 1969, 36,964/69
Int. Cl. C12c 7/00
U.S. Cl. 99—51        16 Claims

ABSTRACT OF THE DISCLOSURE

This invention provides a process for manufacturing a brewers' wort in which an aqueous slurry of a raw starch-containing material is treated under defined temperature and time conditions with discrete amylase and protease enzymes employed at defined activity levels and amylase: protease ratios with respect to the starch-containing material. In this process, the mash bill contains no more than about 30% by weight malt, advantageously no more than about 20% by weight, so that the traditional reliance upon malt (a relatively expensive and complex material) is greatly lessened. Preferably, the mash bill includes up to about 60% by weight of a cereal adjunct, say liquefied corn grits. Preferred embodiments of this process are based on a mashing cycle with a proteolytic reaction at 40° to 55° C. for 30 to 120 minutes followed by a stepwise solubilisation and saccharification procedure involving heating at 64° C. to 68° C. for 35 to 60 minutes at 70° to 80° C.

The invention also includes an enzyme system of defined and standardized activity for use in the conversion of the starch-containing material, and a process for the manufacture of beer or like non-distilled alcoholic beverage.

RELATIONSHIP TO OTHER APPLICATIONS

This application is a continuation-in-part of our application Ser. No. 841,830 filed July 15, 1969, and now abandoned.

BACKGROUND OF THE INVENTION

(a) Field of invention

The present invention relates to the production of a brewers' wort for use in the manufacture of non-distilled alcoholic beverages such as beer, ale, lager, and the like, to an enzyme system for use in obtaining such a brewers' wort and to the conversion of the brewers' wort into such fermented beverages.

(b) Description of the prior art

The production of such beverages normally involves, as is well known, the initial formation of a wort in a mashing process followed by a fermentation process in which fermentable sugars such as maltose present in the wort are converted into alcohol and carbon dioxide. In the brewing of beer, the wort is commonly produced by mashing a slurry of barley malt and adjuncts such as prepared cereals, unmalted raw cereal grains such as corn and rice, or some other carbohydrate source. Unmodified starch-bearing materials such as raw corn grits, must be pre-cooked in a separate cooker before being added to the mash. This is generally done by mixing them with water and finely ground malt, and then boiling the mixture. The malt liquefies the starch material, thereby permitting the subsequent conversion of starch to sugar during the mashing operation.

In the mashing operation itself, the malt, by virtue of enzymes present therein, plays an important role. Thus, $\alpha$-amylases liquefy the starch material of the grain producing mainly non-fermentable sugars like dextrin, while $\beta$-amylases saccharify the liquid starch to fermentable sugars, principally maltose. Further, the proteolytic enzymes break down the high molecular weight proteins to form lower peptides and also significant amounts of amino acids. These decomposition products of proteins not only provide nutrients for the subsequent yeast growth, but also contribute toward characteristic properties of the beer, for example, foam and haze stability and flavour.

This reliance upon malt which is a feature of present practice, is attended by several significant disadvantages. For instance, the material is relatively expensive because of the high cost of barley of malting quality, the time and cost of converting barley into malt, and especially because of the investment, in both plant equipment and labor associated with its production. Moreover, malt contains husks (8–12%), and typically about 2 to 3% of a viscous, fatty liquid which tend to impart an inferior colour and a bitter taste to the wort. Further, the plant needed for malting tends to be complex and expensive, and requires careful supervision through the various stages by skilled technical personnel.

For some time now, the brewing art has recognized these factors, and proposals have been made to lessen the importance of malt in the manufacture of a brewers' wort. Thus, in the specification of our U.S. Pat. No. 3,081,172, a brewers' wort is described which is obtained from a mash of raw cereal grains, for example, barley, treated with a commercially available mixture of proteolytic and amylolytic enzymes, in partial or complete replacement of the malt. The mesh is held at temperatures at which the added enzymes firstly degrade the protein and then convert the solubilized starch to sugar.

This process, which has been successfully employed in making acceptable beer under actual brewing conditions, offers a very substantial decrease in production costs since unmalted barley or corn, or similar starchy material may be used to supply a high proportion of the carbohydrate needed for fermentation instead of the more costly malted grain. However, it is well-recognized that beer is a complex material with many subtle physio-chemical and organoleptic characteristics such, for example, as colour, foam stability, haze stability, head retention and taste. Not surprisingly, therefore, in such an enzymatic process, many factors are involved in obtaining a wort and ultimate beer with characteristics akin to those of a conventional malt wort and beer. For instance, particularly important factors influencing wort and beer properties are the activity levels and relative concentrations of the protease and amylase enzymes. Thus, we have found that wort and beer properties are markedly sensitive to variations in protease and amylase levels and relative concentrations, for such variations can adversely affect the necessary balance between nitrogen content and sugar content, and between fermentable and non-fermentable sugars. Unfortunately, as it happens, many commercially available enzyme preparations are not standardized as to activity so that the activity level often fluctuates, occasionally grossly, from one batch to another. Consequently, it is sometimes difficult to control the enzymatic process to give a reproducible product, and to be able to adjust the process to take account of other variable factors.

OBJECTS OF THE INVENTION

This invention is concerned with an enzymatic treatment of raw starch-containing material to produce a brewers' wort.

An object of this invention is to provide an enzymatic process, for the conversion of raw starch-containing material into a brewers' wort of substantially reproducible properties that are generally superior, for instance, a higher fermentable sugar content (increased attenuation) and a higher formol nitrogen content compared to the worts derived from the process of the above mentioned specification.

Another object is to provide an enzymatic process in which the digestion of the starch-containing material can be readily controlled and adjusted to give a brewers' wort of substantially reproducible properties.

Another object of this invention is to provide an enzyme system of defined and standardized activity that, when used in the digestion of raw starch-containing material, gives a satisfactory brewers' wort on a reproducible basis.

These brewers' worts, when subsequently fermented, consistently provide beer with better organoleptic characteristics and other qualities, for example, head and foam retention, and haze stability than beer brewed from a wort derived from the process as described in the aforementioned specification A further object of this invention, therefore, is to provide a beer with better flavor characteristics and other qualities, for example, head and foam retention, and haze stability than beer brewed from wort made according to the process as described in the aforementioned specification.

Other and related objects of this invention will be apparent from the following description and the accompanying drawings in which:

FIGS. 13 and 14 are graphs showing the relationship of wort properties to another variable in a process according to this invention.

SUMMARY OF THE INVENTION

Figure 1:
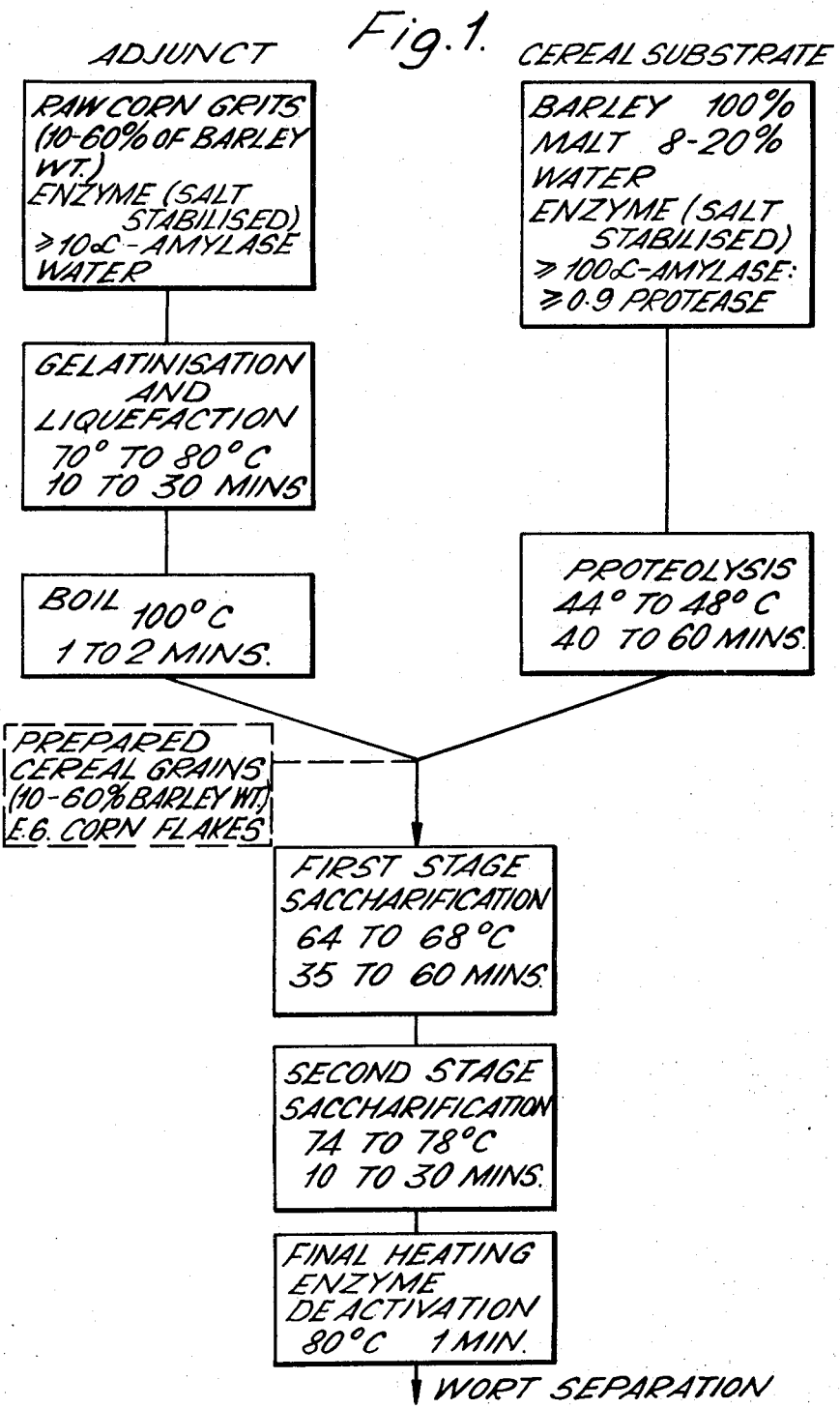
FIGS. 1 to 3 are flow sheets showing the various process steps and their integration in the overall sequence in preferred embodiments according to this invention.

It has now been found according to this invention in one of its aspects that the foregoing and related objects can be attained by reacting a ground or milled starch-containing material under defined temperature and time conditions with up to 30%, based on the weight of starch-containing materials, malt or malt extract and discrete protease and $\alpha$-amylase enzymes in an amount of at least 0.5 modified Kunitz protease units per gm. of starch-containing material and at least 80 modified Stein-Fischer $\alpha$-amylase units per gm. of starch-containing material respectively, the ratio of said amylase to protease enzymes, on an activity basis, being less than 200:1 and preferably in the range between about 170:1 and 75:1.

In a preferred embodiment of this invention, an aqueous slurry of the starch-containing material is commingled in a first step with:

(i) A discrete protease enzyme alone; or
(i) A discrete protease enzyme together with the malt or malt extract; or
(iii) A discrete enzyme mixture containing both protease and $\alpha$-amylase enzymes; or
(iv) A discrete enzyme mixture containing both protease and $\alpha$-amylase enzymes together with the malt or malt extract.

Thereafter, with the pH of the aqueous slurry adjusted if need be to between about 5.0 and about 6.5, the slurry is heated to between about 40° and 55° C. for a period of between about 30 and about 120 minutes. During this period, the protease enzyme breaks down the high molecular weight proteins present in the starch-containing material to form lower peptides and amino acids. At, or toward the end of this proteolytic test period, the malt or malt extract and/or the $\alpha$-amylase enzymes are added, if not previously introduced in the initial stage. The mash is then heated to between 60° and 80° C. to bring about solubilization and saccharification of the starch-containing material. The saccharification is allowed to continue until the carbohydrate spectrum, notably the ratio between the fermentable and the non-fermentable sugars, associated with an acceptable brewers' wort has been attained. Usually the saccharification, as indicated for example, by the iodine color test, is substantially complete after 30 to 120 minutes. When the desired degree of saccharification has been attained, the enzymes are inactivated by raising the temperature of the mash to over 80° C., say 80° to 85° C., at which temperature it is usually held for 2 to 12 minutes. Thereafter, the wort is separated, typically by filtration, from the solid undigested constituents of the mash (spent brewers' grain).

A preferred process according to this invention includes the addition to the aqueous cereal grain slurry at, or toward the end of the proteolytic rest, of a cereal adjunct. This may take the form of a liquefied mass of unmodified starch-bearing cereal grains such as corn grits, corn meal, rice flour, wheat flour, barley flour, sorghum corn, and the like, which have been precooked in a separate vessel. Alternatively, it may take the form of prepared starch-bearing material such, for example, as corn flakes, corn starch, glucose and the like. Preferably, the cereal adjunct is introduced in an amount of between about 10 and about 60%, more preferably between about 42 and about 55%, by weight based on the weight of the adjunct cereal grains relative to the weight of cereal grain substrate in the aqueous slurry.

The expressions "discrete enzyme" or "discrete enzyme mixture," as used herein in relation to the protease and $\alpha$-amylase enzymes refers to an enzyme or mixture of enzymes derived from a plant, bacterial or fungal source, and which has been extracted and purified on an industrial scale, and which manifests a significant protease and/or $\alpha$-amylase activity as the case may be. Other enzymes, aside from the protease and/or $\alpha$-amylase may also be present such, for example, as cellulases, hemicellulases and pectinases. When a discrete amylase mixture is used, then, the protease and $\alpha$-amylase components of the mixture may be, and preferably are, derived from a single source. Alternatively, the components may be derived from different sources, in which event, the resulting enzymes are mixed together in the appropriate proportions for the selected ratio. The enzyme or enzyme mixture may be used, for example, in the form of a solution or supported on a solid substrate.

The determination of protease and $\alpha$-amylase activities, to which reference is made at various passages throughout the specification and claims, is made by specific biochemical assays as follows:

Protease

The protease activity is measured by determining with Folins reagent (available from Fischer Scientific as SO–p–24 Phenol Reagent Solution 2N) the amount of trichloroacetic acid (TCA)-soluble tryosine liberated from a casein substrate under specific conditions of pH, temperature and time. The method employed is essentially that described by Kunitz, Journal of General Physiology, 30,291, 1947 modified in the following respects:

2% casein in 0.066 M phosphate buffer—pH 7.0;
2 mls. enzyme and 2 mls. substrate are used in the enzyme reaction;
Enzyme reaction time is 10 minutes at 37° C.;
Precipitation is achieved with 4 mls. 0.4M TCA; and The precipitated protein is separated using Whatman No. 42 filter paper. In this assay, a protease unit is the amount of enzyme necessary to produce 1 microequivalent of TCA-soluble tyrosine in one minute under the conditions of the assay.

α-Amylase

This activity is measured by determining with 3,5-dinitro-salicylic acid the amount of reducing sugars (maltose) formed from solubilized starch under specific conditions of pH, temperature and time. The method employed is essentially that described by Stein and Fischer, Journal of Biological Chemistry, 232,869 (1958) modified in the following respects:

Merk soluble starch according to Lintner is used;
1% starch, as substrate, is made up in distilled water;
Enzyme dissolved and diluted in 0.05M acetate buffer—pH 6.0;
Incubation is at 37° C. for 5 minutes; and
Reaction mixture is diluted with 10 ml. water.

In this assay, and α-amylase unit is the amount of enzyme necessary to produce 1 microequivalent of maltose in one minute under the conditions of the assay.

Further features relating to the various constituents used in the process and connected with individual steps in the overall process will now be further described.

DETAILED DESCRIPTION OF THE INVENTION

Starch-containing material

Although starch-containing-materials other than cereal grains, such for example, as buckwheat may be used, grains such as degermed corn, rye, rice, wheat, barley or mixtures thereof are preferably used as the substrate. Barley is the preferred cereal substrate as its digestion products after enzymatic attack most closely correspond to the spectrum of a conventional brewers' wort derived from malt; in addition, barley starch is gelatinised at relatively low temperatures, thus permitting its rapid degradation before appreciable heat deactivation of the amylases occurs. Further, the barley enzymes which are liberated during the process are believed to play an important role in producing fermentable sugars. We have found that the grain size markedly influences the enzymatic process. Thus, generally speaking, the finer the grain size, the less enzyme is required for digestion, but the more difficult the subsequent filtration and sparging using conventional brewery mash or lauter filters. Consequently, a system based on fine cereal grains involves low enzyme concentration but high filtration costs. On the other hand, coarser grains, through easier to filter using conventional filter equipment, usually demand a high enzyme concentration. In practice, we have found that a satisfactory compromise between enzyme concentration and amenability of the wort to subsequent filtration on standard filtration equipment may be attained by grinding the grains to a particle size such that the bulk of the particles pass through a No. 14 screen (U.S. Standard Sieves), i.e. have an average particle size of less than 1.41 mm. If desired, the cereal grains, such as barley, may be heated, for instance, to between 120° and 170° F., or treated with suitable chemicals, before slurrying.

Malt

The malt, which is present in small amounts, assists in imparting the characteristic organoleptic properties such as a full-bodied taste to the beer derived from the resulting wort, and is also thought to promote stability. In addition, the malt has amylolytic (α-amylase) as well as limited dextrinase activity. These enzymes are made available during processing and assist in decomposing the grain in its conversion into wort. Whilst the malt may be present in an amount of up to 30% by weight, we have found that between about 8% and about 20%, typically 8% to 12%, by weight gives optimum results consistent with the desideratum of a low malt content. Conveniently, the malt employed is a normal brewers' malt with a diastatic activity of between 120° and 140° Lintner. Normally, the malt is employed is ground form, preferably with a particle size such that about 70% or more passes through a No. 14 screen (U.S. Standard Sieve size).

Enzymes (1) Protease.—The discrete protease enzyme may be derived from a bacterial, fungal, plant or animal source, though bacterial proteases are preferred. Bacterial proteases may, for example, be derived from any of: *Bacillus subtilis; Bacillus amyloliquefaciens; Bacillus polymyxa; Bacillus megaterium* and *Bacillus cereus*.

Fungal proteases may, for example, be derived from any of: *Aspergillus niger; Aspergillus oryzae; Aspergillus tamarii;* and *Rhizopus sp.*

The plant or animal protease may, for example, be pepsin, papain, trypsin, bromelin, ficin or pancreatin; many of which proteases are readily available commercially. We have found that it is desirable for the protease enzyme to include both neutral and alkaline protease components for this is usually advantageous in promoting digestion of the starch and solubilization of the grain protein with the release of small chain peptides and the obtention of a satisfactory spectrum of amino acids (it is believed that the two sorts of proteases are responsible for the release of different types of amino acids).

(2) α-amylase.—The discrete α-amylase enzyme may be derived from a fungal or bacterial source as, for example, from any one of *Bacillus subtilis; Bacillus amyloliquefaciens, Bacillus coagulans, Bacillus polymyxa, Bacillum megaterium, Bacillus cereus, Aspergillus oryzae, Aspergillus niger* and *Rhizopus sp.*

(3) Discrete protease and α-amylase mixture.—The discrete enzyme mixture may be obtained by blending together standardized commercially available protease and α-amylase enzymes in proportions such that the two enzymes are present in the mixture at concentrations that are convenient for subsequent processing and in a ratio, based on activity levels, less than the desired 200:1, preferably in the range between about 170:1 and 75:1.

Preferably, the enzyme mixture takes the form of an enzyme complex obtained by the fermentation of a suitable microorganism, conveniently a bacterium of the genus Bacillus, followed by isolation of the extracellular enzymes. Quite surprisingly, it has been found that if bacterium of the genus Bacillus is grown in a nutrient medium containing a carbon source, a nitrogen source and inorganic salts, an enzyme complex is obtained containing the desired neutral and alkaline protease and α-amylase enzymes in good yields and at concentration levels that are convenient for the subsequent enzymatic conversion process, and in which the ratio of amylase:protease may be readily controlled and, if need be, adjusted during the fermentation to a value desired for the conversion process. Thus, this fermentation process permits the direct production of an enzyme complex containing alkaline and neutral protease and α-amylase well adapted for use in the conversion process, without the need for subsequently balancing the protease:amylase ratio.

Particularly good results are obtained when the bacterium used is a strain of the species *Bacillus subtilis* and, in a preferred embodiment of this invention, the enzyme complex is derived from the submerged fermentation in a suitable nutrient medium of the new strain *Bacillus subtilis* ATCC21556, or a natural or artificial variant or mutant thereof.

The medium used for the fermentation may be either a natural or artificial medium containing at least one carbon source, a nitrogen source, and inorganic salts. As a carbon source, there may be used a mono, di or polysaccharide which is assimilable by the bacterium, for example, glucose, lactose, flour, soya bean meal, Pharmamedia, bran, casein or casein hydrolysates. As examples of inorganic salts, magnesium salts, calcium salts, manganese salts, zinc salts, and various phosphates may be cited. It has been found preferable to use a combination of mono or di, and polysaccharide as a carbon source, for example 0.5% lactose and 2.5% starch. Although inorganic salts may be preferred as a source of nitrogen, organic derivatives generally result in higher yields.

Fermentations may be carried out in submerged culture in fermenters of conventional design or in shaken flasks. The fermentation is inoculated with bacteria from either a solid or liquid seed stage, and incubated at a temperature of 30–45°, preferably 36° C. for a period of 28–40 log hours. The culture is aerated, for example, at 0.2–1.0 v./v. per minute, and agitated sufficiently to ensure no limitation in oxygen transfer rates. Standard methods applicable to the art of fermentation, e.g. sterilization procedures and cycles, antifoam control, etc., are utilized.

The ratio of amylase to protease, if need be, may be adjusted by several means during the manufacture. Such methods include alteration of medium constituents, temperature of incubation, pH, rate of agitation, rate of aeration, harvest time, as well as other procedures.

At the conclusion of the fermentation, the enzyme complex is extracted by conventional means, as by centrifuging and, if need be, filtration. The broth so-obtained usually does not impart any adverse flavour to the ultimate beer, so that it is generally convenient simply to employ the broth itself, if desired after concentrating using, for instance, an evaporator, as the source of the enzyme complex. Stabilizing agents such, for example, as potassium sorbate, glycerol, propylene glycol or sodium benzoate may be added in suitable small amounts to the broth. Alternatively, the enzyme complex may be used in solid form, preferably in conjunction with a carrier, for instance, in the form of a spray dried broth or as a precipitated solid blended with an inert carrier such as starch, gypsum, diatomaceous earth or the like.

Calcium ions usually enhance the resistance of both protease and amylase enzymes to inactivation by heat and, accordingly, to promote enzyme stability during the conversion process, a calcium salt, say calcium carbonate, is often incorporated at a convenient stage in the derivation of the enzyme mixture, or at a later stage.

*Bacillus subtilis* ATCC 21556 is deposited as ATCC strain number 21556 with American Type Culture Collection, 12301 Parklawn Drive, Rockville, Md. 20852. The deposit will be maintained during the life of any patent issuing on this application. The microorganism is a nutrient derived from fermentation of bacterium from the species *Bacillus subtilis*, or, more specifically, a discrete enzyme mixture comprising a complex of extracellular protease and α-amylase derived from a bacterium genus Bacillus, species *Bacillus subtilis*.

(4) Enzyme levels and ratio.—Regardless of whether the protease and amylase enzymes are used in the conversion process separately or together in the form of an enzyme mixture, the consistent improvement in wort and beer properties associated with this invention requires that the protease should be present at an enzymatic level of 0.5 or more, preferably at least 0.9, protease units per gm. of cereal grain substrate.

At protease levels of less than 0.5 unit per gm. there is inadequate protein solubilization of the cereal grains inhering with a poor breakdown of the high molecular weight proteins and a poor release of bound carbohydrates from the starch granules. The net result is that the wort so-obtained has a much reduced content of nitrogen-containing compounds, especially soluble nitrogen-containing compounds like amino acids, and a reduced content of carbohydrates such as fermentable sugars as reflected in the Quick Fermentation, test Q.F. (A.O.A.C. Methods 10.120b) and attenuation data. We have found that these effects often show up in the finished beer which tends to have a low nitrogen content, which can cause flavour and other problems, and a reduced alcohol content. Further, with a protease level below 0.5 unit per gm. the mash is difficult to filter and protracted lautering times are needed using standard brewery equipment. Apart from a minimum activity level, our experimental evidence suggests that there exists a maximum protease level compatible with good protein solubilization and the obtention of a satisfactory brewers' wort and good beer, at around about 2 to 3 protease units per gm. At protease levels much in excess of 2 to 3 protease units per gm. the total nitrogen content in the resulting wort, at around 1000 to 1400 mg./litre, is so high that the finished beer has poor haze and foam stability as well as an unappealing "flat" flavour.

At amylase levels of less than about 100 amylase units per gm. of starch-containing material, we find a marked reduction in starch degradation. This is reflected in a decrease in the gravity and soluble carbohydrate, such as fermentable sugar, content so that the resulting wort has a diminished attenuation and gravity (as reflected in the Plato value), and the beer obtained from such a wort has a reduced alcohol content. There is also an adverse effect on flavour and stability. As with the protease, the experimental data indicates a maximum amylase level, at around 200 to 250 amylase units per gm. compatible with the obtention of a satisfactory brewers' wort and a good beer in an economically favourable process.

In addition to controlling the absolute levels of the protease and amylase enzymes, it is important that relative proportions of the two are such that the amylase: protease ratio, on an activity basis, is less than 200:1 and preferably in the range between about 160:1 and about 80:1. If the amylase:protease ratio is much outside this range then there is a deterioration in the nitrogen and carbohydrate contents and imbalances in the soluble: total nitrogen and non-fermentable:fermentable sugar ratios. Thus, at ratios much below 80:1 we find that the fermentability of the wort (° P.) falls off and the total nitrogen content increases to an unacceptably high level which can give rise to chill haze and foam stability problems in the finished beer; at ratios much above about 200:1 the wort is deficient in total nitrogen, soluble nitrogen and amino acid, and the attenuation and alcohol content falls off, reflecting a reduced conversion.

Aqueous slurry—Step (a)

The cereal grains, say, barley preferably are present in the slurry at a concentration of between about 20 and about 40 gms. preferably 28 gms. to 33 gms. per 100 cc. water (ratio≡1:3.0 to 1:3.5). Preferably, the hardness of the slurry water is between 20 and 35 equivalent parts by weight of Ca and Mg carbonates per 1,000,000 parts by weight of water; if the hardness is less than about 20 p.p.m. then calcium chloride or some other calcium salt may be added to increase the hardness. The addition of calcium ions, in the form of a salt, at this stage for the purpose (aside from increasing the hardness) of enhancing the heat stability of the enzymes offers a convenient alternative to their incorporation, elsewhere during the process, say, in the preparation of the enzyme mixture. The pH of the water is adjusted to between about 5.2 and about 5.8. Usually the pH remains essentially the same throughout the process. Should the pH be outside the broad range recited, then the enzymic conversion is not as effective.

Proteolysis—Step (b)

In this step, the aqueous slurry containing the ground barley, and at least the protease enzyme is heated at about 40° to about 55° C., preferably at about 44° to about 48° C. for the required period of between about 30 and about 120 minutes, preferably about 40 minutes to about 60 minutes. While heating, it is desirable to agitate the slurry vigorously, as by stirring, to ensure intimate contact between the barley substrate and the enzyme. Heating within this temperature range for this period permits both proteolyses of the grain protein by the proteases and digestion of the barley grain by barley enzyme systems.

The proteolytic reaction is directly reflected in the total nitrogen content as well as the α-amino acid content (formol nitrogen) of the wort. Typically, in conventional worts, a total nitrogen content of around 800 to 950 mg./litre and a formol nitrogen content of around 200 to 250 mg./litre are considered satisfactory, though these values can vary fairly widely depending on the kind of beer being made. We found that, with a protease level of 0.5 unit per gm. or more, preferably at least 0.9 unit per gm. and with the temperature held at between 44° and 48° C., these levels can usually be attained in the relatively short time of around 45 minutes, and little is to be gained by prolonging the proteolytic reaction time beyond this.

Cereal adjunct

At, or toward the end of the proteolytic reaction period (when proteolysis is substantially complete), a cereal adjunct is preferably introduced into the main mass. The use of a cereal adjunct permits substantial cost savings and, at the same time, is considered to give a paler coloured beer with a better shelf life.

The cereal adjunct may be derived from raw or unprepared starch-containing cereal grains such, for example, as corn grits, corn meal, wheat flour, barley flour, rice, rice flour, sorghum corn and the like. Alternatively, prepared, i.e. pre-gelatinised starch-bearing cereal grains such, for example, as corn flakes and the like may be used. The cereal grains should be used in an amount of between about 10 and about 60%, preferably between about 42% and about 55%, by weight relative to the weight of cereal substrate, for example, barley, in the initial step, so that the cereal substrate:adjunct ratio in the final mash bill is between 90:10 and 63:37.

More commonly, in practising this invention, the cereal substrate:adjunct ratio is between about 65:35 and 70:30. Quite surprisingly, such relatively high adjunct contents normally give worts with satisfactory nitrogen contents.

The prepared cereal grains may be introduced directly into the main mass for such materials are accessible to the enzymes in the liquefaction and saccharafication stages. The addition of solid cereal grains after proteolysis is substantially complete can be advantageous, in that these grains are not subject to proteolytic degradation as is the main body of cereal grains, i.e. cereal grain substrate. Consequently, it is to be expected that soluble protein materials present in the solid cereal grains incorporated as the adjunct are carried through to the wort, where they can function as wort constituents. It is believed that these proteins may contribute to the obtention of the desired beer head and foam retention. Moreover, the use of prepared cereal grains obviates the need for a cooker operation with the production of a liquefied cereal adjunct as an integral part of the wort manufacturing operation, and this is associated with process economies.

The raw, unprepared cereal grains, on the other hand, must be liquefied prior to the introduction, in order to gelatinise the starch thereby making it available for subsequent liquefaction and, when combined with the main mass, saccharification. This may be accomplished by pre-cooking the cereals in a separate vessel, commonly termed the cereal cooker.

The pre-cooking operation may be performed by mixing the raw cereal grains, for instance, corn grits, with water and either finely ground barley malt or a suitable discrete α-amylase enzyme. The mixture is heated at about 70° to about 80° C., for about 10 to 30 minutes to gelatinise the starch and liquefy it by the action of α-amylases derived from the malt or the discrete enzyme, and then boiled. When barley malt is employed in the pre-cooking operation, it is normally added in an amount of between 10% and 25% of the raw cereal grains. Preferably, however, a discrete α-amylase enzyme is employed in the cooker operation. In those instances in which an enzyme mixture containing both α-amylase and protease enzymes is used in the conversion process, introduced, say, in the first stage, it may conveniently be utilised as the source of α-amylase in this operation. We have found that for satisfactory liquefaction in pre-cooking, it is adequate if the enzyme or enzyme mixture is used at a level of at least 10 amylase units/gm. of raw cereal grains, for instance, at 14 to 16 amylase units/gm. of raw cereal grains.

Solubilisation and saccharification—Steps (d) and (e)

Following any addition of cereal adjunct, the discrete α-amylase enzyme and/or the malt are introduced into the mash if not incorporated during the initial step involving formation of the aqueous slurry of cereal grains. In the event the enzyme complex is used to provide the necessary α-amylase, some additional protease is also included at this stage. The inclusion of additional protease in this way after proteolysis is substantially complete, whilst not necessary, may be advantageous. To effect solubilisation and saccharification, the temperature of the mash is raised to between about 60° and about 80° C., and held at a temperature within this range for the required period of about 30 to about 120 minutes.

During this period, the amylases are highly active in digesting the starch by acting upon, and breaking down, amylose and amylopectin polymers of which starch is composed. The former is an unbranched polysaccharide consisting of long chains of α-(1→4) linked glucose units, and the latter a branched polysaccharide polymer consisting of short chains of α-(1→4) glucose units joined in the (1→6) position to form a large molecule. The mode of action of α- and β-amylase enzymes in digesting the starch is quite different. Thus, the α-amylase randomly hydrolyse α-D-(1→4) linkages in amylose and amylopectin molecules, but do not attack (1→6) and (1→3) linkages. Bacterial and fungal amylases, therefore, effect a rapid fragmentation of starch with the production first of branched oliogosaccharides of medium molecular weight and later, of branched limit dextrins. The final products of starch digestion are a large amount of limit dextrins and smaller amounts of glucose and maltose. The net effect of the α-amylase induced fragmentation is to solubilise, i.e. liquefy, the starch. β-Amylase on the other hand begins to attack at the non-reducing ends of the amylose and amylopectin chains, and proceeds by step-wise removal of maltose units. An inversion of the D-glucosidic linkage occurs, and the maltose liberated is of the β-configuration. Amylose with an even number of D-glucose units is converted completely to maltose while amylose with an odd number of units is converted to maltose and maltotriose which contains the reducing D-glucose unit of the original molecule remains. This limit dextrin contains all of the (1→6) linkages. Since β-amylase attacks only the end of a glucosidic chain, it cannot produce a break in the meshes of the giant starch particles, so that the β-amylase has little solubilising action. The main effect of the β-amylase attack (saccharification) is to produce reducing sugars, principally maltose, which are available for subsequent conversion, in the fermentation process, to alcohol. In summary, the α-amylase liquefies or solubilises the starch with the production of non-fermentable dextrins, while the β-amylase saccharifies the starch to produce reducing, fermentable sugars. It will be readily appreciated, therefore, that to produce a wort of an acceptable carbohydrate spectrum, with the necessary balance between fermentable and non-fermentable sugars, careful control over the solubilisation and saccharification of the starch is demanded.

Not only do the α-amylases and the β-amylases have different modes of action, but they display optimal activity at different temperatures. The optimal temperature will vary depending, for instance, upon the enzyme source.

Normally, however, bacterial α-amylases, heat stabilised by calcium ions, have an optimal temperature between about 70° and 80° C. In comparison, β-amylases, for instance, the β-amylase from barley and/or malt, usually displays maximum activity at lower temperatures than the α-amylase.

Against this background of facts concerning the mode of action of α-amylases and β-amylases and their temperature requirements, and as a result of detailed experimental investigations, we have derived, for this process step, a preferred temperature/time relationship based on a two-stage heating procedure. Such a step-wise temperature profile gives better yields and higher fermentable sugar contents (increased apparent attenuation) in the resulting wort compared with the wort obtained when a substantially steady temperature is maintained during this period.

In this step-wise procedure, the combined mass is initially held at a temperature of about 64° to about 68° C. for between about 35 and about 60 minutes. It is then raised to between about 70° and about 80° C. and held at this higher temperature for between about 10 and 30 minutes. The first stage temperature of 64° to 70° C. is intermediate the optimum for both α-amylase and β-amylase activities, but is still below the temperature at which the β-amylase is inactivated. Consequently, in this first stage, both α- and β-amylase activity proceeds at a fairly fast rate, though less than the optimum. The concerted action both solubilises starch, with the concomitant production of non-fermentable sugars, and saccharifies it with the production of fermentable sugars. In many instances, we find that it is not necessary to hold for more than about 60 minutes at this temperature to give a fermentable sugar content at, or close to, an acceptable level as indicated by an apparent attenuation of about 75%. However, at the end of this period, the yield, which indicates the effectiveness of the starch conversion and is measured by gravity determination, tends to be on the low side. In the second stage, with the temperature at between about 70° and about 80° C., preferably 75° to 78° C., the α-amylase activity is at, or around, optimum so that starch solubilization proceeds rapidly thereby improving the yield. At the same time, since there has already been considerable fragmentation of the starch chains in the preceding step, giving many more intermediate or low molecular weight molecules for attack, the α-amylase in this step tends to produce a higher concentration of fermentable sugars than might be expected. Consequently, the increase in yield can be attained without any marked, if any, reduction in the ratio of fermentable sugars. If desired, however, an increase in the fermentable sugar ratio may be achieved by the addition of malt after a temperature adjustment to about 55° to about 60° C.

Wort separation—Step (f)

At the conclusion of the previous step, the temperature of the mash is raised for a brief period, for instance, 2 to 5 minutes, to over 80° C. to inactivate the enzymes. Thereafter, it is run off, conveniently into a conventional brewery lauter tun or mash filter so as to separate the wort from the spent grains. Other separation methods, for example, centrifuging, or a combination of methods, such as lautering and centrifuging, may be used. The mash is preferably filtered without cooling, but, if desired, may be cooled to ambient temperature before filtration. The filtered digest is then sparged and brought up to the desired volume.

The wort so-obtained may be used directly in making beer by the conventional process steps, so serving as a full replacement for a conventionally produced wort which simplifies the plant required and results in other economies. Alternatively, the wort may be evaporated to a syrup using, for example, a vacuum film evaporator. This syrup may then be stored until required, say, to increase the throughput of a conventional process at peak times. In this event, the syrup, before use, is diluted with water. Advantageously, the syrup contains between about 70 and about 85% by weight total solids, preferably about 75 to 80%. Alternatively, the wort may be dried into a powder using, for example, a spray drier, which is then dissolved in water to give a wort as and when required. When concentrating or drying, careful temperature control is needed to avoid discoloring or otherwise damaging the wort properties. Bittering substances like hops may be added before concentrating or drying the wort.

In converting the wort into beer, the conventional procedures are employed. For instance, the wort is admixed with bittering adjuncts like hops and boiled. The heat completely inactivates the enzymes and sterilizes the wort, while the extraction of the hops provides flavour and preservative constituents. The wort is thereafter cooled and fermented by the addition of an appropriate brewers' yeast, such as a "bottom yeast" commonly employed in the manufacture of the type of alcoholic beverage generally known as lager, and a "top yeast" commonly employed in the manufacture of the type of alcoholic beverage generally known as ale. The yeast utilises the normally fermentable sugars which are present in the wort. The primary fermentation of the wort (bottom yeast) typically takes place at about 7° to 14° C., and usually takes from 3 to 10 days. This is followed by the secondary or "lager" fermentation usually at 0° to 5° C. for about two to eight weeks or longer. Thereafter, the beer is clarified or filtered, carbonated and packaged.

Figure 2:
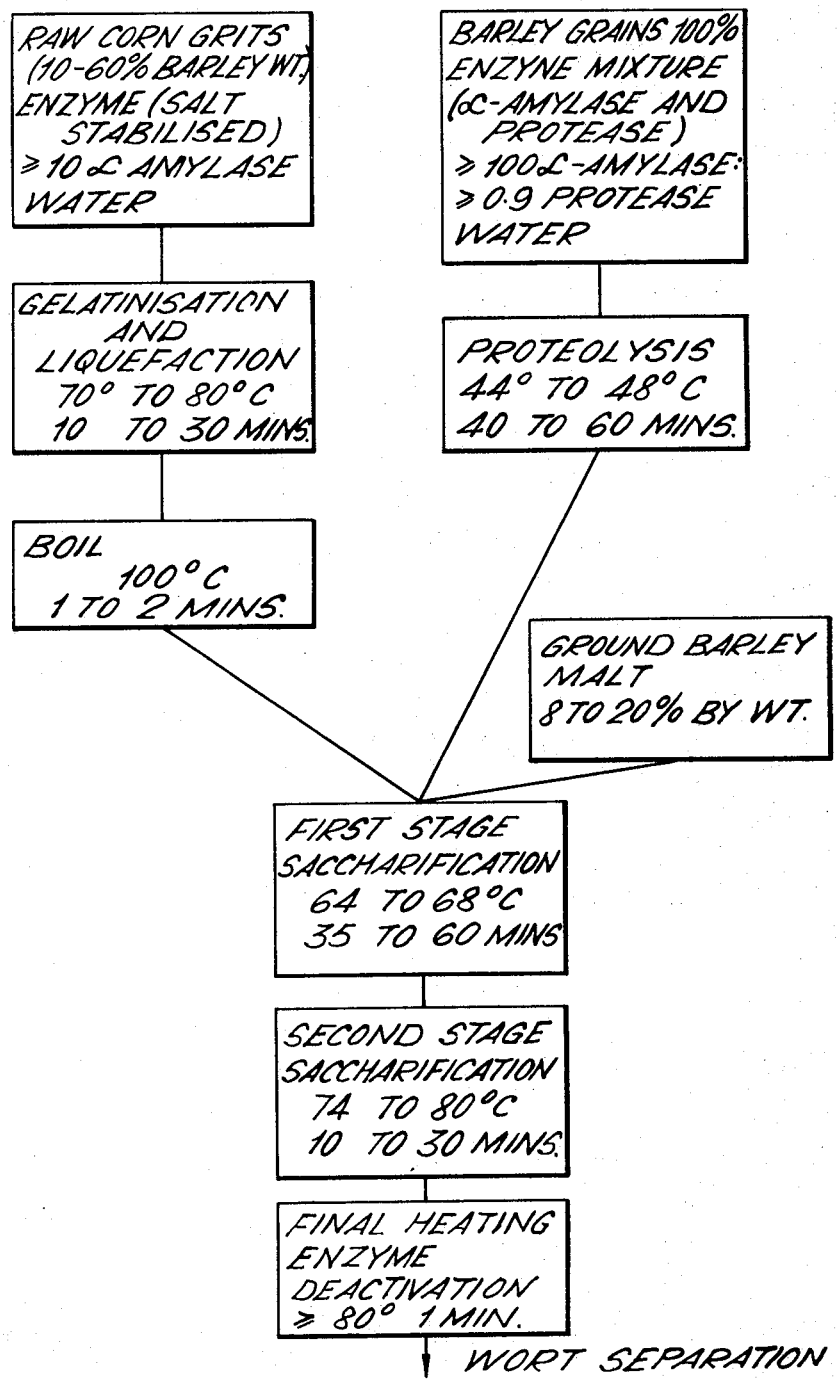
Figure 3:
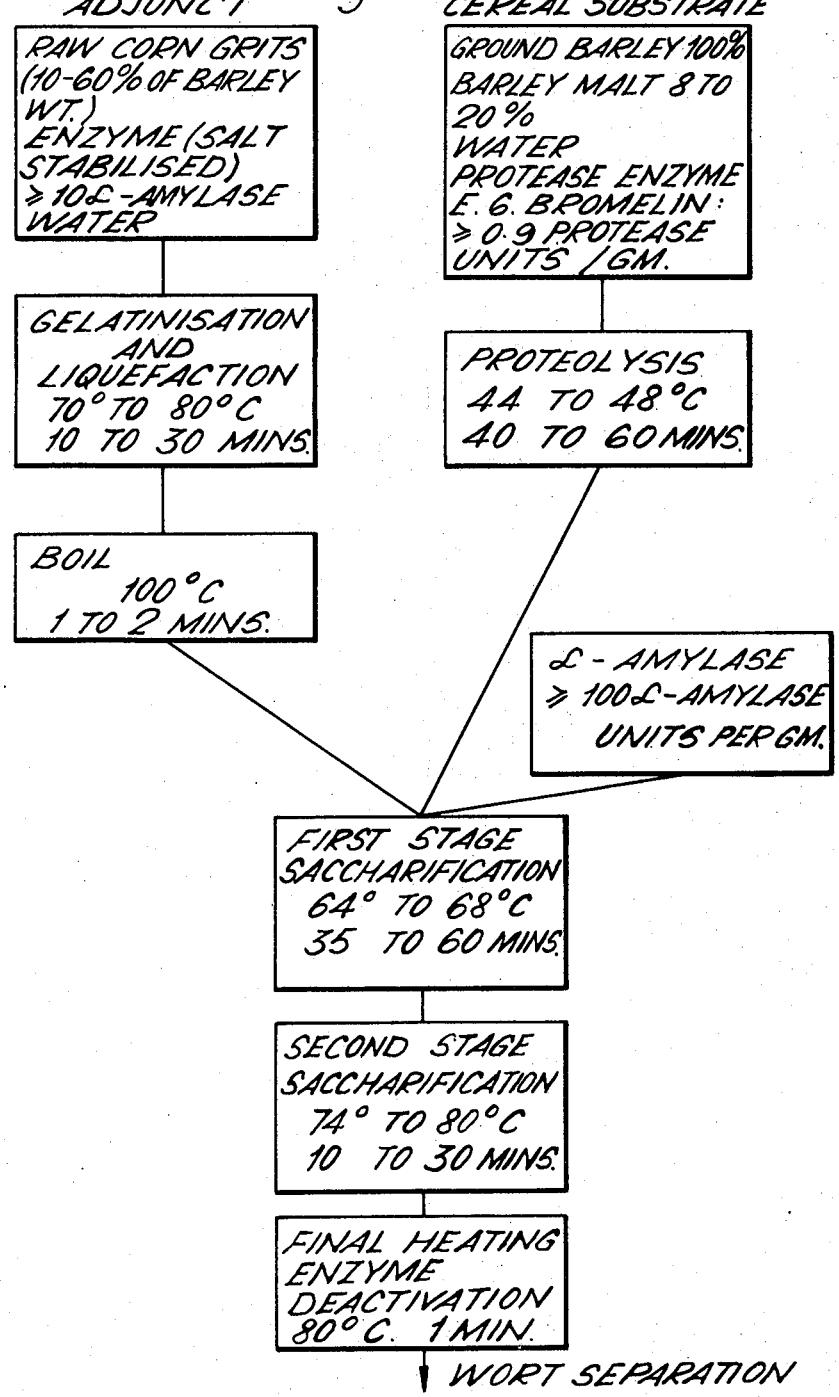

Preferred processes according to this invention are illustrated in the flow sheets of FIGS. 1 to 3 of the accompanying drawings.

Referring to FIG. 1, the process disclosed in the flow sheet, involves commingling in a mash tub finely ground barley grains as the cereal substrate with 8 to 20%, say 10%, by weight, based on the weight of cereal substrate, barley malt, salt stabilised discrete enzyme mixture in the form of the enzyme complex derived from a *Bacillus subtilis* strain at a level of 100 α-amylase units/gm. and at least 0.9 protease units/gm. (110:1), and water in proportions such that the solids:water ratio is 1:2.5 to 1:4.5. This aqueous slurry is then heated to 44° to 48° C., and held at a temperature in this range for 40 to 60 minutes during which time the protease breaks down the barley protein. Simultaneously with this treament of the barley substrate, the cereal adjunct is prepared in a pre-cooking operation. This involves the initial formation of an aqueous slurry (in an amount of 20 to 60% by weight relative to the weight of cereal grain substrate) and a salt stabilised α-amylase containing enzyme at a level of at least 10 α-amylase units. For convenience, the enzyme mixture used in the barley treatment is employed in this step as the α-amylase source. This corn mash is then heated at 70° to 80° C. for 10 to 30 minutes in order to gelatinise and liquefy the raw corn grits. It is then briefly boiled, after which the liquefied mash is dropped into the mash tub. The temperature of the combined mash is first raised to 64° to 68° C., and held in this range for 35 to 60 minutes. After this rest period, the temperature is raised to 74° to 78° C., and the mash held in this range for 10 to 30 minutes. At the end of this second saccharification rest period, the temperature is raised to over 78° C., usually around 80° to 85° C., and momentarily held at this temperature to substantially deactivate the amylases. Immediately thereafter, the mash is dropped into the lauter tun and the wort collected. In a modification of this process, the liquefied cereal adjunct is replaced by solid, prepared cereal grains such as corn flakes, desirably in an amount of between 40 to 60% by weight, based on the weight of cereal grain substrate.

The process shown in the flow sheet of FIG. 2 is similar to that of FIG. 1 except that the malt addition is delayed until after the inclusion of the cereal adjunct (liquid or solid). In a modification of this process, the discrete enzyme mixture used in the first stage may be replaced by a discrete protease enzyme alone, for instance, bromelin, ficin, pepsin or papain, and a discrete α-amylase enzyme added, say, along with the malt, after inclusion of the cereal adjunct.

The process shown in the flow sheet of FIG. 3 is similar to that of FIG. 1 except that the discrete enzyme mixture used in the first stage is replaced by a discrete protease enzyme, for instance, bromelin, ficin, pepsin or papain at a level of at least 0.9 unit per gm. and the α-amylase enzyme is added to the combined mash following the inclusion of the cereal adjunct (liquid or solid). The α-amylase enzyme may be added in the form of a discrete α-amylase enzyme alone, or as a component of discrete enzyme mixture that also contains a protease enzyme, conveniently the enzyme complex desired from a *Bacillus subtilis* strain.

Figure 4:
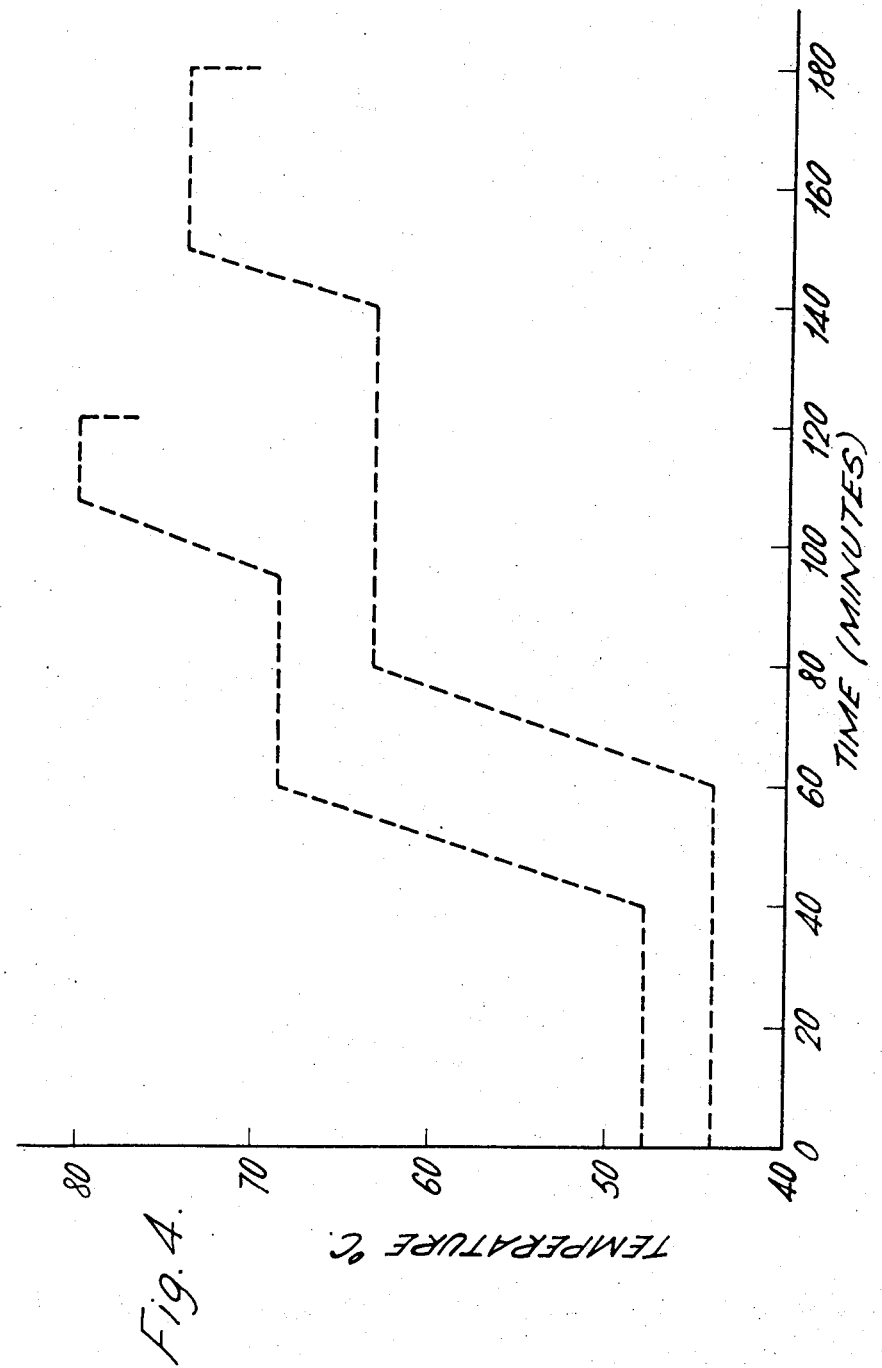
FIG. 4 is a graph giving the temperature and time ranges delineating satisfactory mash cycles in the preferred embodiments of this invention.

The temperature/time profile in the solubilisation and saccharification stage, in the overall mash cycle in the preferred processes is shown in the graph of FIG. 4.

When barley is used as the cereal substrate a properly balanced, light-coloured wort with satisfactory starch and protein breakdown may be obtained following the sequence of steps outlined in the several flow sheets. Moreover, such a wort normally has higher fermentable sugar and nitrogen contents, as indicated by apparent attenuations of around 72 to 75% or more, total nitrogen levels of around 800 to 950 mg./litre or more and formol nitrogen levels of around 200 to 250 mg./litre or more, compared with the worts that can be consistently obtained following the teachings of the aforementioned prior art specification.

EXAMPLES OF PREFERRED EMBODIMENTS

The following examples are provided to facilitate a more comprehensive understanding of the present invention. It will be understood that the examples are given by way of illustration only and should not be construed as limiting the scope of the invention.

EXAMPLE 1

Preparation of a discrete enzyme complex

An inoculum of *Bacillus subtilis* was prepared by transferring organisms from a nutrient agar slant, or similar suitable growth medium to a sterile seed medium consisting of casein hydrolysate (2%), calcium chloride (0.01%) and potassium dihydrogen phosphate (0.1%) adjusted to pH 6.0. The medium (100 ml.) was dispersed into an Erlenmeyer shaken flask (300 ml.). The broth was sterilized, inoculated, and incubated for a period of 40 hours at 36° C. on a reciprocal reactor (200 r.p.m.). Upon completion of the fermentation the broth was recovered by filtration using conventional techniques and monitored for amylase and protease activity by the assay procedures indicated hereinbefore.

Results:

| | |
|---|---|
| Amylase activity | 1420 modified Stein-Fischer units/ml. |
| Protease activity | 18.68 modified Kunitz units/ml. |
| Neutral protease* | 8.26 modified Kunitz units/ml. |
| Alkaline protease* | 10.42 modified Kunitz units/ml. |
| Amylase: protease ratio | 113:1. |

*The sample is assayed for total protease both in the presence and absence of an inhibitor (phenylmethyl sulfonylfluoride) which destroys the alkaline protease activity. Thus, the alkaline protease value is given by the difference between the total and neutral protease readings.

EXAMPLE 2

Preparation of culture filtrate

An inoculum of *Bacillus subtilis* growth medium was transferred to a seed medium of the type specified in the foregoing example. The seed fermentation was carried out in a 15 l. vessel of conventional design. The fermentation was incubated at 36° C. (airflow 1.0 s.c.f.m., agitation 400 r.p.m. using 2×2½″ diameter turbine impellors) until a satisfactory growth was obtained (8–12 hours). It is usually necessary to incorporate some form of antifoam such as commercially available silicone in order to minimise foaming problems. The mature seed (1% w./v.) was transferred under sterile conditions to the production medium consisting of wheat starch (2.1%), corn steep liquor (6.9%), lactose (0.71%), magnesium sulfate (0.05%), calcium carbonate (0.5%) and potassium dihydrogen phosphate (0.6%), adjusted to pH 6.2 prior to sterilization. The fermentation was carried out in a 1000 litre fermenter of conventional design, incubated at 36° C., agitated at 186 r.p.m. and aerated at 0.6 s.c.f.m. for a period of 36 hours. Upon completion of the fermentation, the broth was recovered by centrifuging at a bowl gravity of 8,000, and then filtering to give a sparkling filtrate. Enzyme analyses gave the following results:

| | |
|---|---|
| Amylase activity | 1600 modified Stein-Fischer units/ml. |
| Protease activity | 12.5 modified Kunitz units/ml. |
| Neutral protease | 7.7 modified Kunitz units/ml. |
| Alkaline protease | 4.8 modified Kunitz units/ml. |
| Amylase: protease ratio | 128:1. |

The broth was stabilised by the addition of propylene glycol (5.0% w./w.) and potassium sorbate.

EXAMPLE 3

This example illustrates the preparation of a brewers' wort and beer according to this invention under actual plant conditions.

Part A—Brewers' wort

Raw materials (i) Barley.—Conquest barley was used. This barley was cleaned and then hulled giving around 10% w./w. hulls, and the hulls separated by aspiration. The barley kernels were then ground in a Hobart Model 2020 Grinder adjusted to No. 1 setting. The ground grains were then mixed with the hulls. The mixture had the following spectrum determined by screen analysis (U.S.A. Standard Sieve Sizes).

| Mesh No.: | Percent w./w. retained on screen |
|---|---|
| 10 | 2 |
| 14 | 24 |
| 18 | 45 |
| 30 | 17 |
| 60 | 8 |
| 100 | 2 |
| Pan | 2 |

(ii) Malt.—Ground malt barley was used with a diastatic activity of 137° Lintner. The grist spectrum as determined by screen analysis (U.S.A. Standard Sieve Sizes) was as follows:

| Mesh No.: | Percent w./w. retained on screen |
|---|---|
| 10 | 10 |
| 14 | 16 |
| 18 | 26 |
| 30 | 28 |
| 60 | 12 |
| 100 | 4 |
| Pan | 4 |

(iii) Water.—Normal brewing water was used with a total hardness of around 30 p.p.m. and a pH of 5.4.

(iv) Salts.—6 gm. gypsum and 9.5 g. calcium chloride per 12½ imperial gallons are added to the water used for slurrying the barley.

(v) Enzyme.—The enzyme complex, in the form of a broth, obtained by the procedure of Eample 2 herein was used as the enzyme source. It had an α-amylase activity of 1600 units/ml. and a protease activity of 12.5 units/ml. with an amylase:protease ratio of 128:1.

(vi) Cereal adjunct.—Raw corn grits with a moisture content of 11.5% w./w. were used as a cereal adjunct. The spectrum as determined by screen analysis (U.S.A. Standard Sieve Sizes) was as follows:

| Mesh No.: | Percent w./w. retained on screen |
|---|---|
| 30 | 15.5 |
| 60 | 80 |
| 100 | 2.5 |
| Pan | 2 |

(vii) Mash bill:

| Constituent | Total weight, kg. | Ratio | Extractable weight, kg. |
|---|---|---|---|
| Barley | 6.205 | 64 | 3.850 |
| Raw corn grits | 3.468 | 36 | 2.850 |
| Malt | 0.610 | | 0.427 |

Mash cycle

Figure 5:
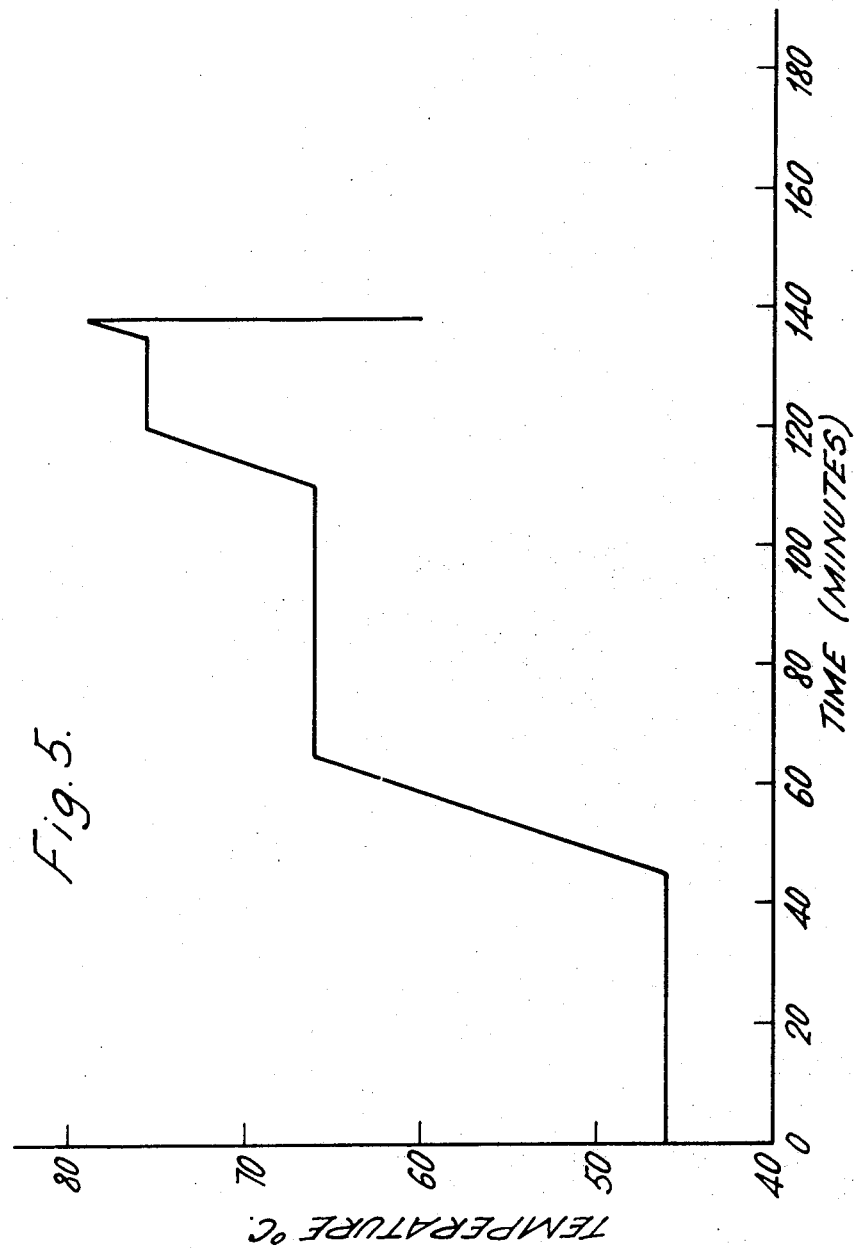
FIG. 5 is a graph showing the temperature/time profile of the mash cycle employed in the procedure of examples herein.

The mash cycle followed is shown in the graph given as FIG. 5 of the accompanying drawings.

Step (a).—24 litres of water were added to the mash tun, and the salt-stabilised enzyme-containing broth slowly stirred in at an enzymic level of 115 α-amylase units and 0.9 protease unit per gm. of barley (amylase: protease≡128:1) subsequently to be incorporated. Thereafter, 6.205 kg. ground barley and 0.61 kg. ground barley malt were added. The slurry so-obtained was vigorously stirred.

Step (b).—Steam was admitted to the jacket of the mash tun and the temperature of the aqueous slurry raised to 46° C. This temperature was held for 45 minutes, during which time the slurry was continuously stirred.

Step (c).—Simultaneously, the raw corn grits were liquefied. 12 litres of water were added to the corn cooker, and the salt-stabilised enzyme-containing broth slowly stirred in at an enzymic level of 14α-amylase units per gm. of raw corn grits subsequently to be incorporated. 3.458 kg. raw corn grits were then added and the slurry vigorously stirred. The slurry was first heated to 71° C., and this temperature is held for 16 minutes. Thereafter, the corn mash was brought to the boil (come-up time≡2 minutes), and held at boiling point for 2 minutes. The liquefied mash was then dropped into the barley mash in the mash tun at the end of the 45-minute proteolytic reaction time.

Steps (d) and (e).—The temperature of the combined mash was raised to 65.5° C. (come-up time≡12 minutes) and this temperature was maintained for 45 minutes as a first saccharification step. Thereafter, the temperature was raised to 74° C. with a come-up time of 10° minutes. This temperature, when attained, was held for 15 minutes as a second saccharification step. At the end of the 15 minutes, the digested mash was raised to 82° C., and held at this temperature for 1 minute.

Step (f).—The mash at 82° C. was dropped directly into the lauter tun. The bottom of the lauter tun was covered with water to prevent the mash particles from clogging the slits in the plates. The mash was allowed to settle for 10 minutes, and then raked out, after which the wort was recycled for 5 minutes.

The wort was then run off. The clarity was good. Once the wort was run down to the bed level sparging was started with water at 77° C. Lautering was continued until a total of 61.3 litres wort were collected. The run-off time was 30 minutes. The overall time for the brewing cycle was around 300 minutes which was about the same as for the conventional malt wort made in the same plant.

The wort so-obtained was light coloured and had a properly balanced amino acid and carbohydrate spectrum. An analysis showing characteristic wort properties is given in Table I hereunder which also includes, for comparative purposes, an analysis of a typical conventional malt wort suitable for the commercial manufacture of beer.

TABLE I

| Property | Barley wort | Conventional wort |
|---|---|---|
| Extract (°Plato) | 11.9 | 11.9 |
| Total nitrogen (mg./litre) | 926 | 875 |
| Formol nitrogen (mg./litre) | 294 | 293 |
| pH | 5.1 | 5.1 |
| Apparent attenuation (percent) | 76.5 | 79.8 |

The amino acid spectrum of the wort when compared with the amino acid spectrum of a conventional malt wort was very similar.

Part B—Beer

The wort was converted directly into beer by the following procedure:

(i) The boil.—Before the boil was started, 42.8 g. of hops were added to the wort in the kettle. The wort was boiled for 90 minutes. 30 minutes before the end of the boil, an additional 28.8 g. of hops and 2.9 g. Irish moss were added followed, 5 minutes before the end of the boil, with a further 14.4 g. of hops. During the open boil the volume fell by evaporation from 61 liters to about 56–59 litres. At the conlusion of the boil the wort was placed in the hop jack where it remained for 10 minutes. The wort was then slowly run into the pan where it was allowed to settle for 30 minutes. The wort was then cooled to 114.4° C. (58° F.) in a plate cooler and run off into the fermenter. A larger yeast (*Saccharomyces carlsbergensis*) was added a rate of 100 g. pressed yeast per 40 litres wort.

(ii) Fermentation.—Wort was placed in a glass carboy and oxygen bubbled through to give dissolved oxygen level of 20 p.p.m. The yeast was then pitched and well mixed with the wort. Fermentation was continued for 7 days at 14.4° C. (58° F.). At the end of the fermentation, the natural sulphur dioxide content of the primary storage beer was adjusted to 15 p.p.m. by the addition of sodium metabisulphite.

(iii) Aging.—A stainless steel keg was used for aging. The beer was dropped into the keg and 0.068 mls. Protesal (a chill-proofing enzyme) added and the keg put under 20 p.s.i.g. carbon dioxide pressure. Primary aging was effected at 1° C. (33° F.) for 14 days, after which the beer was passed to filtration.

(iv) Filtration.—The primary filtration was made through a sparkler filter. The beer was filtered into another keg to which was added Clearfil filter aid (7.0 g.). The beer was then filtered again through a sparkler filter with a coating of 4C filter aid (23 g.) into another keg. Following secondary filtration the beer was carbonated to 2.8–3.0 volumes.

(v) Bottling.—The beer was bottled with the keg under 15 p.s.i.g. $CO_2$; before capping the bottles were tapped to release dissolved oxygen.

(vi) Pasteurization.—The beer was pasteurized at 60° C. (140° F.) for about 2 minutes. The total time in the pasteurizing tunnel was 26.6 minutes, with an exit temperature of about 27° C. (80° F.).

(vii) Storage.—The bottled beer was stored at room temperature or in a refrigerator at +4° C. (39° F.). Testing was made immediately after bottling and during storage. The matured beer was judged by means of standard physico-chemical analysis and organoleptic tests. Pertinent results, as well as the analysis of a commercial control beer derived from a conventional malt wort, included for comparative purposes, is shown in Table II below.

TABLE II

| Property | Barley | Control |
| --- | --- | --- |
| Apparent extract (percent) | 2.8 | 2.4 |
| Real extract (percent) | 4.29 | 4.16 |
| Alcohol (percent by weight) | 3.7 | 3.8 |
| Original extract (percent) | 11.85 | 11.6 |
| Colour (SRM) | 2.9 | 3.1 |
| pH | 4.15 | 4.0 |
| Isohumolone (IBU) | 18. | 17 |
| Foam (SIG) | 136 | 134 |
| Diacetyl, p.p.m | 0.08 | 0.08 |
| Protein (percent) | 0.26 | 0.32 |
| $SO_2$, p.p.m | 5.0 | 4.0 |
| Iron, p.p.m | 0.10 | 0.12 |
| Force haze test (F.T.U.'s) | 110 | 160 |

Referring to this table, it will be seen that the enzymatic beer is similar in most respects to the control beer, save that it has superior haze stability. With regard to organoleptic properties, statistical analysis of the results obtained from experienced brewery taste panels, showed that there was no clear preference for either, and the enzymatic beer was just as acceptable as the commercial control beer.

In comparison with the beer derived from the process of the aforementioned specification (in this case following the teaching of Example 1 therein) the instant beer had a superior flavour (more body and less sweet) a higher alcohol content and a better stability which is to be expected as the wort from which it was made had a higher attenuation and formol nitrogen content.

EXAMPLE 4

The procedure of the foregoing example was repeated except that the addition of the 0.610 kg. ground barley malt was delayed until the conclusion of the proteolytic rest and the inclusion of the liquefied corn adjunct. It was then added rapidly and without interruption to the mash tun, and dispersed by stirring.

The resulting wort had the following analysis:

Wort:
    Extract (° Plato) _____ 11.2
    Total nitrogen (mg./litre) _____ 940
    Formol nitrogen (mg./litre) _____ 255
    pH _____ 5.2
    Apparent attenuation (percent) _____ 76.3

These analytical values showed that this wort is an acceptable starting material for the manufacture of beer, and, as expected, fermented into a beer with a characteristic full-bodied taste of good foam adhesion and stability.

EXAMPLE 5

The procedure of Example 4 was repeated except that the enzyme complex in the initial step was replaced by a discrete protease enzyme, and the enzyme complex at an enzymic level of 115 α-amylase units per gm. of barley substrate was introduced as the source of α-amylase at the conclusion of proteolysis and following inclusion of the liquefied cereal adjunct. The particular protease enzyme used was a commercial bromelin, which is the papainaise obtained from pineapple juice, available from Mann Research Laboratories, New York (Catalogue No. 05300-293). The solid bromelin was used at an enzymic level of 1.5 protease units per gm. of barley in the aqueous slurry.

The resulting wort had the following analysis:

Wort:
    Extract (° Plato) _____ 11.7
    Total nitrogen (mg./litre) _____ 950
    Formol nitrogen (mg./litre) _____ 234
    pH _____ 5.2
    Apparent attenuation (percent) _____ 75.2

This wort was fermented into a beer, which had a light to moderate body and moderate hop character; the aroma was clean and neutral.

EXAMPLE 6

This example illustrates the effect of varying the amylase and protease levels and the amylase:protease ratios on several pertinent wort properties.

The experiments were conducted on standard laboratory mash units fitted with cooker and mash mixer cups. The following raw materials were used:

Mash bill

Corn cooker:
    Corn _____ 34.6 gms.
    Water _____ 140 mls.
    Enzyme _____ Enzyme complex of Eg. 1
    Salts _____ at 14 amylase units/gm. corn.

Mash mixer:
    Barley _____ 62.0 gms.
    Malt _____ 6.2 gms.
    Water _____ 205 mls.
    Enzyme _____ As indicated below.
    Salts _____ {0.06 gm. gypsum.
                          {0.095 gm. calcium chloride.

The barley and the corn were ground on a laboratory scale grinder to an average particle size of around 1.41 mm.

Water

Ordinary brewery water at pH 5.2–5.6.

Enzyme

Four enzyme systems were selected to give a range of amylase:protease ratios. These enzyme systems and the assays thereof are indicated below.

| Enzyme system | Code No. | Amylase, units | Protease, units | Amylase: protease |
| --- | --- | --- | --- | --- |
| Enxyme complex derived from *B. subtilis* ATCC 21556 | 1 | 5,450/ml. | 6.2/ml. | 879:1 |
| Do | 2 | 5,000/ml. | 30/ml. | 167:1 |
| Pacific Protease A [1] | 3 | 7,250/gm. | 157/gm. | 46.2:1 |
| Pacific Protease G [1] | | 10,200/gm. | 490/gm. | 20.8:1 |
| Pacific Amylase 1 [1] | | 105,000/gm. | 340/gm. | 308:1 |
| Blend (G+1) | 4 | 33,900/gm. | 453/gm. | 75 |

[1] Commercially available from Western Biochemical Corporation, California.

The Pacific Protease G and Pacific Amylase 1 were blended in a ratio of 3:1 and designated Enzyme system #4. Each of the four enzyme systems was introduced into the barley mash at amylase levels of 45, 80, 100, 114 and 150 amylase units per gm. barley giving the following combinations of amylase and protease concentrations in the mash.

| | Amylase level, u./gm: | | | | |
| --- | --- | --- | --- | --- | --- |
| | 45 | 80 | 100 | 114 | 150 |
| | Protease level, u./gm. | | | | |
| Enzyme: | | | | | |
| #1 | 0.05 | 0.09 | 0.11 | 0.13 | 0.17 |
| #2 | 0.27 | 0.48 | 0.60 | 0.68 | 0.9 |
| #3 | 0.6 | 1.05 | 1.32 | 1.52 | 1.99 |
| #4 | 0.97 | 1.73 | 2.16 | 2.47 | 3.24 |

Mash cycle

The mash cycle shown in FIG. 5 was used in each run.

Operation

A standard mashing procedure was followed in all the runs. The barley mash water was brought to a steady temperature of 120° F. in the mash unit; the salts, enzyme, barley and malt were added in that order, allowing about 30 seconds between each for thorough mixing. The pH of the mash was noted. In the meantime, the corn was liquefied in the corn cooker by heating an aqueous slurry of the corn grits containing the α-amylase enzyme to around 70° C., holding at this temperature for 10 minutes, then briefly boiling. The liquefied corn adjunct was mashed into the aqueous slurry of the barley and the mashing continued. At the end of the cycle, the mash was lautered and the lauter time recorded. The clarity of the run-off was estimated visually according to a graded scale from 1 to 5, 1 representing a murky and cloudy wort in contrast with 5 which represented a clear bright (sparkling) wort. The starch conversion was also checked by the iodine color test. The lauter bed was sparged with water to a total volume of 610 mls. The made up wort was then boiled for 1 minute, allowed to cool, then again made up to 610 mls. The Plato, Total nitrogen, Formol nitrogen and Quick Fermentation values were then determined on the final wort.

Results

The complete results from the various runs are summarized in Table III which also includes, for comparative purposes, the corresponding data obtained from six malt control runs.

than about 200:1. On comparing the various curves of FIGS. 6 to 8 it can be seen that the optimum balance between attenuation, total nitrogen content and formol nitrogen content and the best match between the barley/enzyme worts and the malt control worts are obtained with amylase levels of about 80 or more amylase units per gm. barley and an amylase:protease ratio of less than about 200:1, advantageously between about 160:1 and about 80:1.

Figure 9:
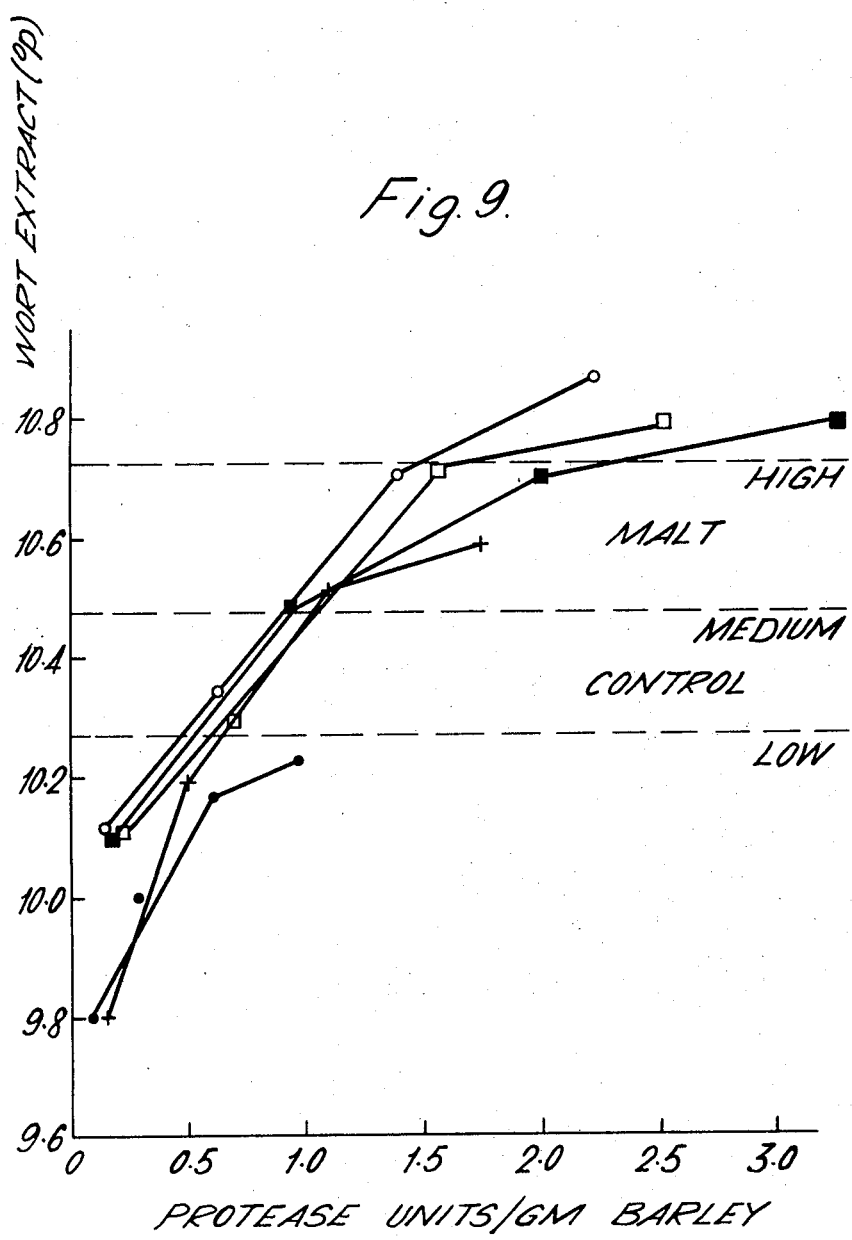
Figure 10:
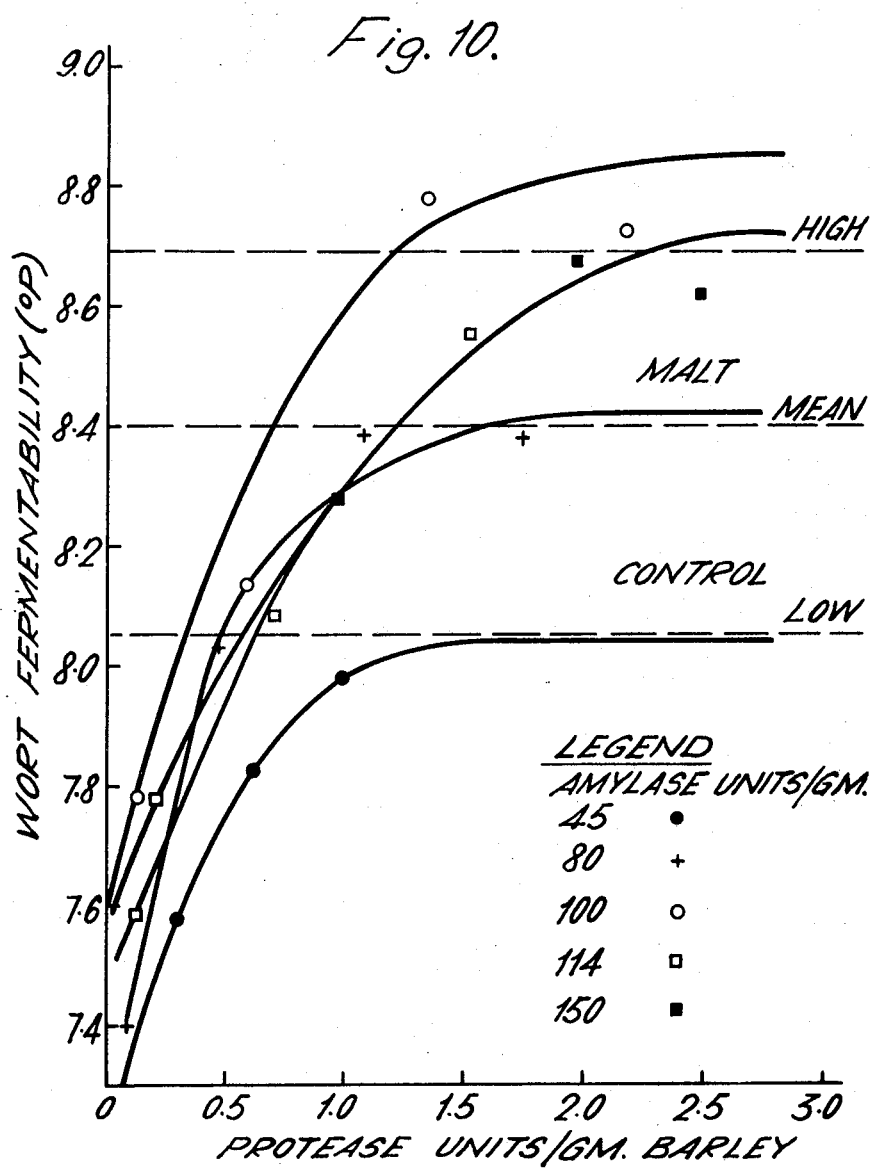

With regard to the relationship between wort properties and protease level, FIGS. 9 and 10 show that the wort extract (°P.) and fermentability (attenuation—°P.) increase with increasing protease level up to about 1.5 to 2.0 protease units/gm. barley after which little further increase is noted. A protease level of around 0.8 to 0.9 unit per gm. barley is needed to attain the mean malt control extract value. It is also significant to find that the extract and fermentability values appear to be correlated to, and influenced by, the amylase level in that the highest values

TABLE III

| | | 45 | | | 80 | | | 100 | | | 114 | | | 150 | | | Malt control | | | | | | |
|---|---|---|---|---|---|---|---|---|---|---|---|---|---|---|---|---|---|---|---|---|---|---|---|
| Protease level, u/gm. barley | 0.05 | 0.27 | 0.6 | 0.97 | 0.09 | 0.48 | 1.05 | 1.73 | 0.112 | 0.60 | 1.32 | 2.16 | 0.128 | 0.68 | 1.52 | 2.47 | 0.168 | 0.90 | 1.99 | 3.24 | 1 | 2 | 3 | 4 | 5 | 6 | Mean |
| Amylase:protease, x:1 | 900 | 166 | 76 | 46 | 900 | 166 | 76 | 46 | 900 | 166 | 76 | 46 | 900 | 166 | 76 | 46 | 900 | 166 | 76 | 46 | | | | | | | |
| Wort Plato (°P.) | 9.8 | 10.0 | 10.2 | 10.2 | 10.1 | 10.2 | 10.5 | 10.6 | 10.1 | 10.35 | 10.7 | 10.9 | 10.4 | 10.3 | 10.7 | 10.8 | 10.5 | 10.7 | 10.7 | 10.8 | 10.3 | 10.7 | 10.4 | 10.5 | 10.45 | 10.8 | 10.5 |
| QF | 2.5 | 2.3 | 2.3 | 2.3 | 2.3 | 2.15 | 2.1 | 2.2 | 2.4 | 2.25 | 1.9 | 2.15 | 2.1 | 2.15 | 2.15 | 2.2 | 2.3 | 2.2 | 2.0 | 2.15 | 2.25 | 2.35 | 2.1 | 2.05 | 1.9 | 2.1 | 2.1 |
| Total nitrogen X10² (percent N) | 4.4 | 6.4 | 7.2 | 9.7 | 4.2 | 6.8 | 8.4 | 10.8 | 5.3 | 7.0 | 8.5 | 10.6 | 6.3 | 7.8 | 8.4 | 10.2 | 7.2 | 7.2 | 8.5 | 11.2 | 8.5 | 8.2 | 7.7 | 7.1 | 8.1 | 8.2 | 7.9 |
| Formol nitrogen (mg./liter) | 128 | 142 | 165 | 175 | 160 | 200 | 230 | 265 | 146 | 210 | 238 | 316 | 143 | 220 | 249 | 295 | 150 | 225 | 265 | 318 | 200 | 212 | 217 | 248 | 202 | 246 | 235 |
| pH | 5.6 | 5.6 | 5.5 | 5.4 | 5.6 | 5.6 | 5.55 | 5.5 | 5.6 | 6 | 5.55 | 5.55 | 5.6 | 5.6 | 5.55 | 5.55 | 5.6 | 5.6 | 5.55 | 5.55 | 5.55 | 5.55 | 5.5 | 5.5 | 5.5 | 5.5 | 6.5 |
| Conversion [1] | | | | | | | | | | | | | | | | | | | | | | | | | | | |
| Run-off clarity [2] | 3 | 3 | 3 | 4 | 4 | 4 | 4 | 4 | 4 | 4 | 4 | 4 | 4 | 4 | 4 | 4 | 4 | 4 | 4 | 4 | 4 | 3 | 4 | 3 | 3 | 3 | 3 |
| Run-off time (mins.) | 35 | 35 | 35 | 35 | 35 | 30 | 30 | 30 | 30 | 30 | 30 | 30 | 30 | 30 | 30 | 30 | 30 | 30 | 30 | 30 | 40 | 40 | 30 | 30 | 30 | 30 | 30 |
| Wort fermentability (°P.) | 7.3 | 7.6 | 7.6 | 8.0 | 7.4 | 8.05 | 8.4 | 8.4 | 7.8 | 8.15 | 8.8 | 8.75 | 7.6 | 8.1 | 8.6 | 8.6 | 7.8 | 8.3 | 8.7 | 8.65 | 8.05 | 8.35 | 8.3 | 8.45 | 8.55 | 8.7 | 8.4 |

Figure 6:
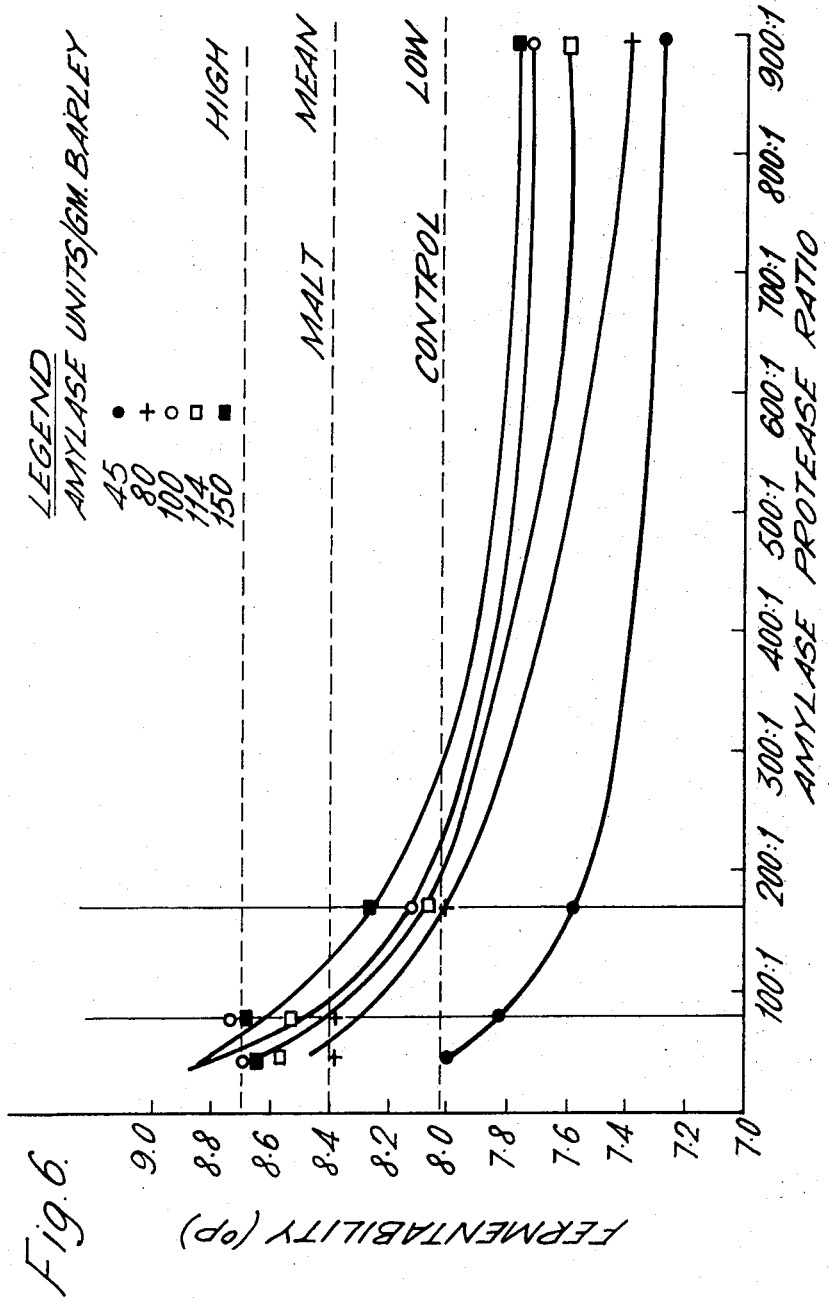
FIGS. 6 to 11, are graphs showing the effects of varying the amounts, and relative concentrations of amylase and protease enzymes used in the mashing process on typical wort properties.
Figure 7:
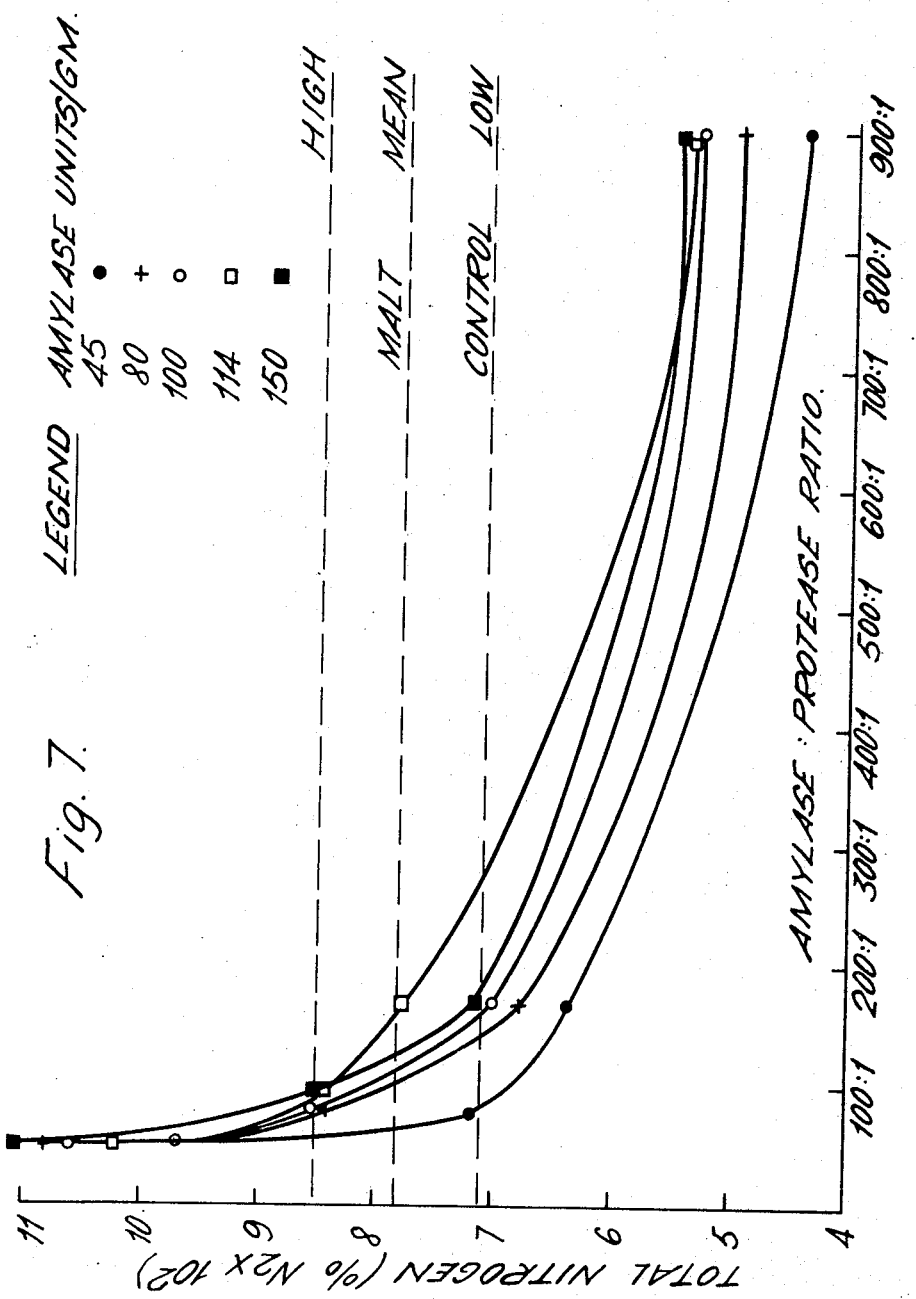
Figure 8:
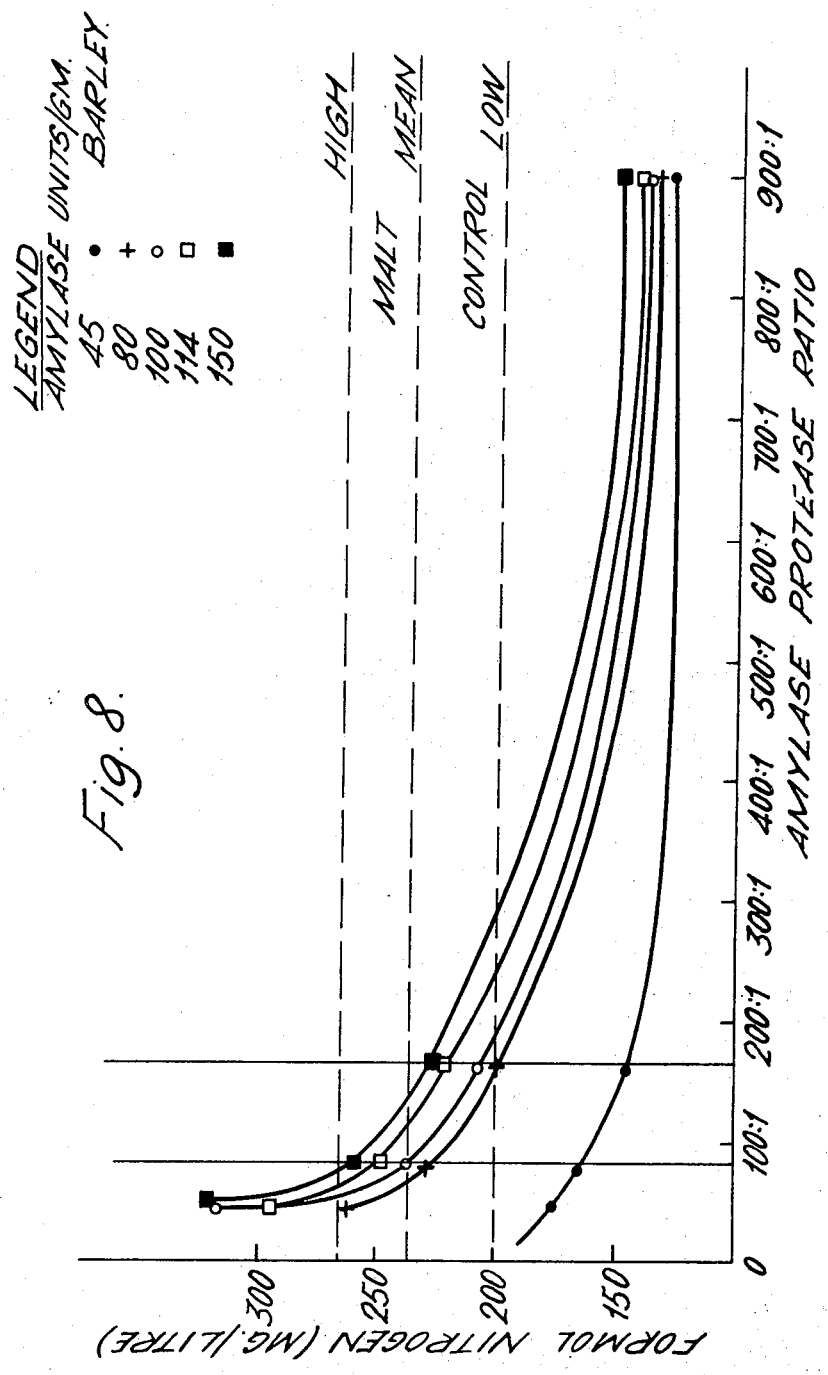
Figure 11:
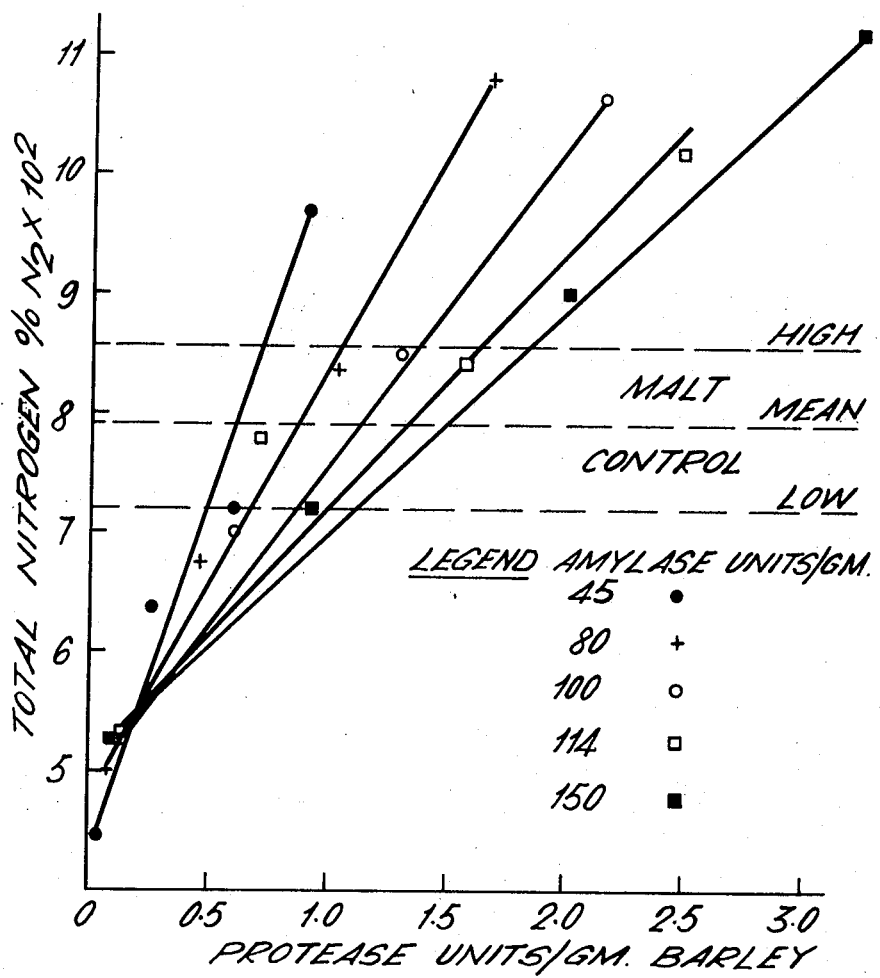

[1] Conversion scale (Iodine color test): 1=Clear; 10=Purple.  [2] Clarity scale: 1=Murky-cloudy; 5=Clear-bright The variations in wort fermentability, total nitrogen content and formol total nitrogen content with variations in the amylase:protease ratio, and wort extract, wort fermentability and content with variations in the protease level are shown in the graphs of FIGS. 6 to 11, respectively, of the accompanying figures. Reference to these figures shows the distinct advantages of working within the claimed amylase:protease ratios and amylase and protease levels. Thus, as shown in FIG. 6, the attenuation of the worts (wort fermentability in °P.) tends to level out or actually decrease at amylase:protease ratios below about 80:1 and to decrease markedly at ratios higher than about 200:1. The total nitrogen contents of the worts increase to an unacceptably high level at ratios below 80:1 and fall away to relatively low levels at ratios higher are obtained with an amylase level of 100 units per gm. barley and not, as would be expected, with the 150 amylase units level. However, as shown, both the 114 and 150 amylase units curves are displaced below the 100 amylase units curve. The variation of the total nitrogen content of the worts with increasing protease level is shown in FIG. 11, which indicates that the total nitrogen content increases with increasing protease levels. However, surprisingly, at a given protease level, the total nitrogen content increases with decreasing amylase level; for example, at 1.0 protease units per gm. barley, 150 amylase units per gm. barley give a total nitrogen value of $7.1 \times 10^2$ percent, while 80 amylase units per gm. give $8.4 \times 10^2$ percent. Hence, to obtain a given total nitrogen value, a higher protease level is apparently needed with increasing amylase level.

EXAMPLE 7

The procedure of the foregoing example was repeated except for the following details:

(i) Mash bill

Corn cooker:
- Corn ------ 24.9 gm.
- Water ------ 90 mls.
- Enzyme ------ Enzyme complex of Eg. 1 at 14 amylase units/gm. corn.
- Salts ------ 0.03 gm. gypsum.

Mash mixer:
- Barley ------ 55.0 gms.
- Malt ------ 19.5 gms.
- Water ------ 230 mls.
- Enzyme ------ As indicated below.
- Salts ------ {0.06 gm. gypsum.
  0.095 gm. calcium chloride.

The mash bill for the six malt control runs was as follows:

Corn cooker:
- Corn ------ 24.9 gms.
- Malt ------ 2.96 gms.
- Water ------ 90 mls.

Mash mixer:
- Malt ------ 65 gms.
- Water ------ 240 mls.
- Salts ------ {0.06 gm. gypsum.
  0.095 gm. calcium chloride.

(ii) Enzyme system

Enzyme complex No. 2 was replaced by another enzyme complex (#5) derived from B. substilis ATCC 21556 assaying at 8,000 amylase units/ml. and 38.8 protease units/ml. The amylase/protease combinations used in the various runs are summarized below:

| Enzyme: | Amylase level, units/gm. | | | | |
|---|---|---|---|---|---|
| | 45 | 80 | 100 | 114 | 150 |
| | Protease level, units/gm. | | | | |
| #1 | 0.05 | 0.09 | 0.11 | 0.13 | 0.17 |
| #5 | 0.22 | 0.39 | 0.48 | 0.55 | 0.73 |
| #3 | 0.60 | 1.07 | 1.33 | 1.52 | 1.99 |
| #4 | 0.97 | 1.73 | 2.17 | 2.46 | 3.25 |

Results

The worts so-obtained were analyzed for the same properties as the worts of the foregoing example and graphs corresponding to FIGS. 6 and 11 plotted. These graphs showed essentially the same relationships between amylase:protease ratio and amylase/protease levels and wort properties.

EXAMPLE 8

The procedure of Example 3 was repeated with different mash bills and enzyme systems as summarized in the following Table IV, which also includes the results of analyses on the worts and beers so-obtained as well as the corresponding data for a conventional malt wort and beer serving as the control.

TABLE IV

| Run number | 27 | 30 | 33 | 40 | 61 | 32 |
|---|---|---|---|---|---|---|
| Mash bill: | | | | | | |
| Barley | 5,851 | 5,851 | 5,851 | 5,851 | 5,578 | 2,555 |
| Malt | 1,463 | 1,463 | 1,463 | 1,463 | 1,395 | 6,510 |
| Corn | 2,691 | 2,691 | 2,691 | 2,691 | 2,956 | |
| Enzyme system [1] (#) | 5 | 6 | 7 | 8 | 9 | [2] |
| Amylase, u./ml. | 3,600 | 7,945 | 8,625 | 8,775 | 33,980 | |
| Protease, u./ml. | 30 | 60 | 93.8 | 62.5 | 235 | |
| Amylase: protease | 120:1 | 132:1 | 92:1 | 140:1 | 130:1 | |
| Amylase, u./gm. barley | 114 | 114 | 114 | 114 | 203 | |
| Protease, u./gm. barley | 0.95 | 0.86 | 1.24 | 0.81 | 0.92 | |
| Wort analysis: | | | | | | |
| Made up gravity (° P.) | 10.4 | 10.5 | 10.4 | 10.3 | 10.4 | 10.4 |
| Yield (B.M.E. percent) | 97.4 | 99.5 | 97.5 | 96.8 | 98.9 | 99.4 |
| Kettle gravity (° P.) | 11.7 | 11.9 | 11.9 | 11.9 | 12.0 | 12.0 |
| Q.F. | 2.7 | 2.6 | 2.5 | 2.5 | 2.6 | 2.5 |
| Total nitrogen (mg./litre) | 873 | 868 | 861 | 879 | 883 | 868 |
| Formol nitrogen (mg./litre) | 270 | 252 | 258 | 252 | 263 | 272 |
| pH | 4.3 | 4.2 | 4.4 | 4.3 | 4.0 | 4.15 |
| Apparent attenuation (percent) | 77.1 | 77.3 | 77.0 | 77.8 | 78.0 | 79.0 |
| Beer analysis: | | | | | | |
| Colour, SRM | 2.6 | 2.5 | 2.5 | 2.9 | | 2.4 |
| Foam, SIG | 116 | 120 | 113 | 135 | | 125 |
| Percent app. ext | 2.6 | 2.4 | 2.3 | 2.3 | | 2.1 |
| pH | 4.40 | 4.30 | 4.50 | 4.20 | | 4.25 |
| Formol nitrogen (mg./litre) | 216 | 197 | 135 | 205 | | 222 |
| $O_2$ (p.p.m.) | 3 | 3 | 7 | 8 | | 4 |
| Diacetyl (p.p.m.) | .06 | .14 | .25 | .06 | | .09 |
| Iron (p.p.m.) | .02 | .04 | .06 | .09 | | .05 |
| Copper (p.p.m.) | .11 | .13 | .11 | .16 | | .11 |
| Percent protein | .35 | .35 | .35 | .37 | | .33 |
| Percent acidity | .18 | .16 | .16 | .17 | | .17 |
| Isohumulones (IBU) | 21 | 18 | 21 | 15 | | 18 |
| Percent real ext | 4.33 | 4.15 | 4.70 | 4.13 | | 4.10 |
| Percent alcohol V | 4.85 | 4.92 | 4.95 | 4.89 | | 5.06 |
| Percent cal. orig. ext | 11.4 | 11.5 | 12.0 | 11.6 | | 12.0 |
| Percent yeast ferm. ext. | .0 | .0 | .0 | .0 | | .0 |
| Init. sed. rating | 190 | 1 | 1 | 1 | | 1 |
| For Test 1 wk. Rad. FTU | 190 | 200 | 110 | 180 | | 230 |
| Initial chill haze | 55 | 60 | 65 | 60 | | 50 |

[1] Enzyme system: Enzyme systems #5 to 8 (Runs #27, 30, 33 and 40) were in the form of enzyme complexes derived from the cultivation of *B. subtilis* ATCC 21556 following generally the procedure of Example 2 herein and containing both neutral and alkaline protease. Enzyme system #9 (Run 61) was derived by blending together 56 ml. "Tenase" (commercially available from Miles Laboratories) assaying at 14,300 amylase units/ml. and "HTP 200") also commercially available from Miles Laboratories) assaying at 19,680 amylase units/gm. and 235 protease units/gm. including 110 neutral amylase units/gm. and 125 alkaline protease units/gm.

[2] Malt control.

Conclusions

The results indicate that the barley/enzyme worts and beers had substantially similar physico-chemical properties to the conventional malt control. Taste tests conducted on the various beers showed that all were acceptable, with a slightly higher preference score for the beer of Run #33. All the beers were found to be clean and neutral in aroma with a moderate to full-bodied taste and mild to moderate hop character.

EXAMPLE 9

In this example, various commercially available enzymes were blended together in defined proportions to provide different enzyme systems each of which was then used to convert a given grain bill into a brewers' wort employing laboratory mash units (fitted with cooker and mash mixer cups) and following basically the procedure of Example 3 herein.

Part A (i) Grain bill:

| | Grams | Percent |
|---|---|---|
| Barley | 66.4 | 100 |
| Corn | 29.2 | 44 |
| Malt | 5.3 | 8 |

(ii) Enzyme system:

Amylase—
 Tenase (Miles).
 Amylase activity (u./ml.) _____ 14,100
 Amylase level (u./gm. barley) _____ 100
 Volume (percent of barley) ____v./w__ 0.7

Protease—
 Ficin.
 Protease activity (u./gm.) _____ 543.6
 Protease level (u./gm. barley) _____ 1.1
 Weight (percent of barley) _____w./w__ 0.2
 Amylase:protease _____ 91:1

Part B (i) Grain bill:

| | Grams | Percent |
|---|---|---|
| Barley | 60.0 | 100 |
| Corn | 32.4 | 54 |
| Malt | 7.2 | 12 |

(ii) Enzyme system:
  Amylase—
    Tenase (Miles).
      Amylase activity (u./ml.) _____ 14,100
      Amylase level (u.8gm. barley) _____ 114
      Volume (percent of barley) ___v./w__ 0.8
  Protease—
    Bromelain.
      Protease activity (u./gm.) _____ 203.5
      Protease level (u./gm. barley) _____ 0.9
      Volume (percent of barley) ____w./w__ 0.44
      Amylase:protease _____ 127:1

Part C (i) Grain bill:

|  | Grams | Percent |
| --- | --- | --- |
| Barley | 64.4 | 100 |
| Corn | 30.9 | 48 |
| Malt | 5.1 | 8 |

(ii) Enzyme system:
  Amylase—
    HT 1000 (Miles).
      Amylase activity (u./gm.) _____ 55,400
      Amylase level (u./gm. barley) _____ 140
      Volume (percent of barley) ___w./w__ 0.25
  Protease—
    Ficin.
      Protease activity (u./gm. barley) _____ 543.6
      Protease level (u./gm. barley) _____ 0.9
      Volume (percent of barley) ____w./w__ 0.16
      Amylase:protease _____ 155:1

Part D (i) Grain bill:

|  | Grams | Percent |
| --- | --- | --- |
| Barley | 62.0 | 100 |
| Corn | 27.9 | 44 |
| Malt | 11.2 | 18 |

(ii) Enzyme system:
  Amylase—
    Novo bacterial amylase.
      Amylase activity (u./gm.) _____ 9500
      Amylase level (u./gm. barley) _____ 100
      Volume (percent of barley) ____w./w__ 1.05
  Protease—
    Bromelain.
      Protease activity (u./gm.) _____ 203.5
      Protease level (u./gm. barley) _____ 1.2
      Weight (percent of barley) ____w./w__ 0.59
      Amylase:protease _____ 83.1

Part E (i) Grain bill:

|  | Grams | Percent |
| --- | --- | --- |
| Barley | 60.0 | 100 |
| Corn | 32.4 | 54 |
| Malt | 7.1 | 12 |

(ii) Enzyme system:
  Amylase—
    HT 1000 (Miles).
      Amylase activity (u./gm.) _____ 55,400
      Amylase level (u./gm. barley) _____ 128
      Weight (percent of barley) ____w./w__ 0.23
  Protease—
    Bromelain.
      Protease activity (u./gm,) _____ 203.5
      Protease level (u./gm. barley) _____ 1.25
      Weight (percent of barley) ____w./w__ 0.61
      Amylase:protease _____ 102:1

Part F (i) Grain bill:

|  | Grams | Percent |
| --- | --- | --- |
| Barley | 66.4 | 100 |
| Corn | 29.2 | 44 |
| Malt | 5.3 | 8 |

(ii) Enzyme system:
  Amylase—
    HTP 200 (Miles).
      Amylase activity (u./gm.) _____ 19,680
      Amylase level (u./gm. barley) _____ 114
      Weight (percent of barley) ____w./w__ 0.58
      Amylase:protease _____ 84:1
  Protease—
    HTP 200 (Miles).
      Protease activity (u./gm.) _____ 235
      Protease level (u./gm. barley) _____ 1.36
      Weight (percent of barley) ____w./w__ 0.58
      Amylase:protease _____ 84:1

Part G (i) Grain bill:

|  | Grams | Percent |
| --- | --- | --- |
| Barley | 62.0 | 100 |
| Corn | 27.9 | 44 |
| Malt | 11.2 | 18 |

(ii) Enzyme system:
  Amylase—
    HT conc.
      Amylase activity (u./gm.) _____ 283,000
      Amylase level (u./gm. barley) _____ 140
      Weight (percent of barley) ___w./w__ 0.05
  Protease (a blend of)—

(a)
    HT conc.
      Protease activity (u./gm.) _____ 430
      Protease level (u./gm. barley) _____ 1.0
      Weight (percent of barley) ____w./w__ 0.05

(b)
    Ficin.
      Protease activity (u./gm.) _____ 543.6
      Protease level (u./gm. barley) _____ 1.0
      Weight (percent of barley) ____w./w__ 0.144
      Amylase:protease _____ 140:1

Part H (i) Grain bill:

|  | Grams | Percent |
| --- | --- | --- |
| Barley | 60.0 | 100 |
| Corn | 32.4 | 54 |
| Malt | 7.2 | 12 |

(ii) Enzyme system:
  Amylase—
    Novo bacterial amylase.
      Amylase activity (u./gm.) _____ 9500
      Amylase level (p./gm. barley) _____ 128
      Weight (percent of barley) ____w./w__ 1.34
  Protease—
    Ficin.
      Protease activity (u./gm.) _____ 543.6
      Protease level (u./gm. barley) _____ 1.35
      Weight (percent of barley) ____w./w__ 0.25
      Amylase: Protease _____ 95:1

PART I (i) Grain bill:

|  | Grams | Percent |
| --- | --- | --- |
| Barley | 62.0 | 100 |
| Corn | 27.9 | 44 |
| Malt | 11.2 | 18 |

(ii) Enzyme system:
Amylase—
  HT Conc. (Miles).
    Amylase activity (u./gm.) _____ 28,300
    Amylase level (u./gm. barley) _____ 114
    Weight (percent of barley) ____w./w__ 0.04
Protease (a blend of)—

(a)

HT Conc. (Miles).
  Protease activity (u./gm.) _____ 430
  Protease level (u./gm. barley) _____ 1.4
  Weight (percent of barley) ____w./w__ 0.04

(b)

Bromelian.
  Protease activity (u./gm.) _____ 203.5
  Protease level (u./gm. barley _____ 1.4
  Weight (percent of barley) ___w./w__ 0.60
  Amylase:protease _____ 81:1

Part J (i) Grain bill:

|  | Grams | Percent |
|---|---|---|
| Barley | 64.4 | 10 |
| Corn | 30.9 | 48 |
| Malt | 5.1 | 8 |

(ii) Enzyme system:
Amylase—
  HTP 200 (Miles)
    Amylase activity (u./gm.) _____ 19,680
    Amylase level (u./gm. barley _____ 100
    Weight (percent of barley) ____w./w__ 0.51
    Amylase: protease _____ 84:1

In each of Parts A to J, the corn was liquefied in the cooker using percent by weight ground malt.

Results

Data from the analysis of the brewers' wort obtained from each of Parts A to J, and a control malt wort run under identical processing condition with 60% by weight malt, is summarized in Table V below.

Part A

|  | Percent by wt. |
|---|---|
| Barley | 100 |
| Corn | 50.1 |
| Malt | 0 |

Barley: corn≡66.6:33.4.

Part B

| Barley | 100 |
|---|---|
| Corn | 53.6 |
| Malt | 6 |

Barley:corn≡65:35.

Part C

| Barley | 100 |
|---|---|
| Corn | 55.86 |
| Malt | 10 |

Barley:corn≡64.2:35.8.

Part D

| Barley | 100 |
|---|---|
| Corn | 57.0 |
| Malt | 18 |

Barley:corn≡63.7:36.3.

Part E

| Barley | 100 |
|---|---|
| Corn | 59.0 |
| Malt | 25 |

Barley:corn≡63:37.

TABLE IV

| Wort property | Parts of— | | | | |
|---|---|---|---|---|---|
|  | A | B | C | D | E |
| Extract (° P.) | 10.5 | 10.55 | 10.6 | 10.5 | 10.5 |
| Q.F. | 2.0 | 2.4 | 2.25 | 2.15 | 2.20 |
| Formol nitrogen (mg./litre) | 180 | 199 | 210 | 218 | 220 |
| Attenuation (percent) | 75.2 | 77.3 | 78.8 | 79.5 | 79.0 |

The results show that the wort extract remains essentially constant regardless of malt level, though there is a slight peak in Part C (10% malt level); the Q.F. and attenuation tend to improve with increasing malt content to the 18% level with the 25% malt level showing no real improvement over the 18%.

TABLE V

| Wort property | Parts of— | | | | | | | | | | Malt control |
|---|---|---|---|---|---|---|---|---|---|---|---|
|  | A | B | C | D | E | F | G | H | I | J |  |
| Extract (° P.) | 10.5 | 10.7 | 10.2 | 10.4 | 10.6 | 10.2 | 10.5 | 10.3 | 10.2 | 10.1 | 10.7 |
| Total nitrogen (mg./litre) | 822 | 852 | 848 | 825 | 848 | 822 | 841 | 840 | 810 | 820 | 861 |
| Formol nitrogen (mg./litre) | 218 | 242 | 246 | 220 | 246 | 218 | 211 | 236 | 215 | 221 | 252 |
| pH | 5.35 | 5.35 | 5.4 | 5.35 | 5.4 | 5.4 | 5.3 | 5.35 | 5.4 | 5.4 | 5.3 |
| Apparent attenuation (percent) | 76.0 | 79.0 | 75.0 | 76.5 | 80.5 | 74.0 | 79.5 | 77.0 | 75.5 | 74.5 | 80.0 |
| Conversion [1] | 1 | 1 | 1 | 1 | 1 | 1 | 1 | 1 | 2 | 1 | 1 |
| Run-off clarity [2] | 4 | 4 | 4 | 4 | 5 | 4 | 4 | 4 | 4 | 4 | 4 |
| Run-off time (mins.) | 30 | 30 | 30 | 35 | 30 | 30 | 30 | 30 | 35 | 35 | 30 |

[1] Conversion scale (Iodine color test): 1=Clear; 10=Purple.   [2] Clarity scale: 1=Murkey-cloudy; 5=Clear-bright.

The brewers' wort obtained in each of Parts A to J is fermented into a beer with an acceptable taste, aroma, color and stability.

EXAMPLE 10

This example illustrates the effect of varying the malt level on wort properties.

Basically, the laboratory scale procedure of Example 6 hereinbefore was followed except that the enzyme complex of Example 2 was employed in the conversion and the mash bills used were as follows:

EXAMPLE 11

This example illustrates the effects of varying temperature and time during the proteolytic reaction period on wort properties.

Basically, the laboratory scale procedure of Example 6 was followed except that the enzyme complex of Example 2 was employed in the conversion and the temperature and time for the proteolytic reaction in the mash cycle of FIG. 5 were varied as shown in Table VII below. Pertinent wort properties are also summarized in this table.

TABLE VII

|  | Temperature (° C.) | | | | |
|---|---|---|---|---|---|
|  | 36 | 40 | 46 | 46 | 55 |
|  | Time (minutes) | | | | |
|  | 30 | 60 | 50 | 60 | 30 |
| Wort properties | | | | | |
| ° P | 9.8  9.85 | 10.3  10.2 | 10.45  10.5 | 10.3  10.25  10.2 | 10.3 |
| Q.F | 2.35  2.45 | 2.3  2.25 | 2.2  2.2 | 2.15  2.1  2.4 | 2.45 |
| Formol nitrogen (mg./litre) | 169  171 | 182  185 | 203  205 | 205  203  164 | 166 |
| Attenuation (percent) | 76.8  75.1 | 77.7  78.0 | 78.9  79.0 | 79.1  79.5  76.5 | 76.2 |

Figure 12:
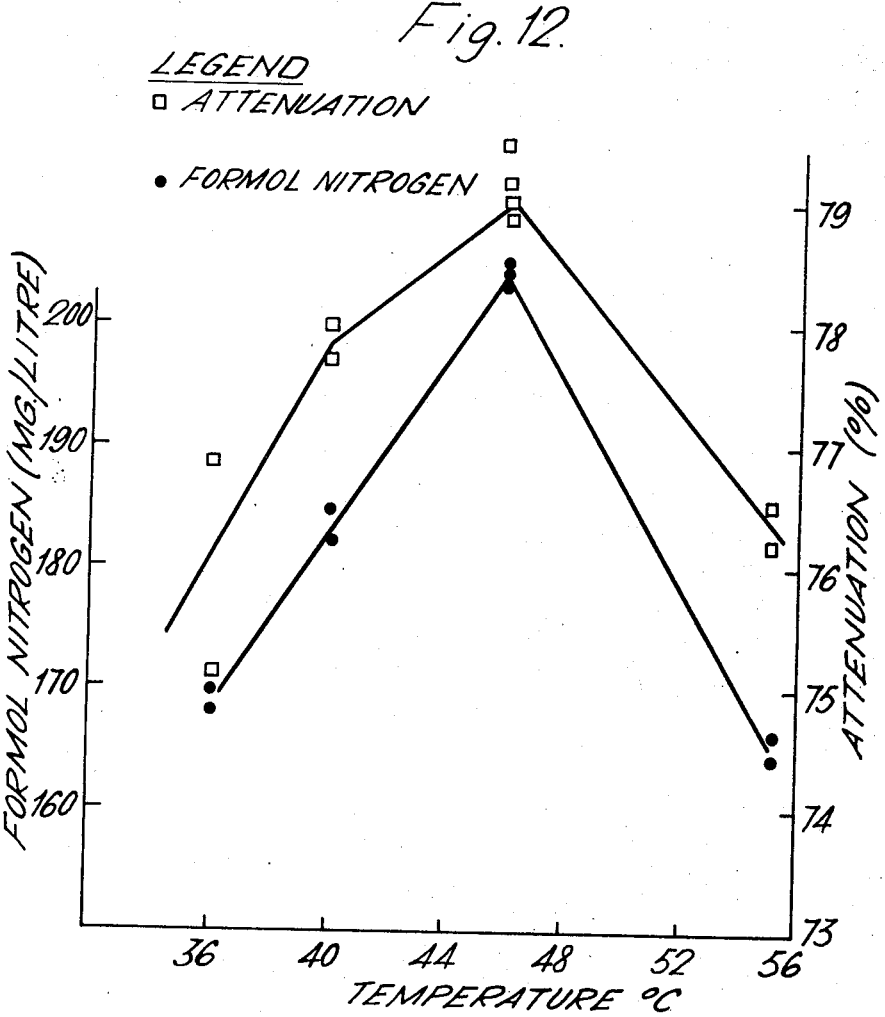
FIG. 12 is a graph showing the relationship of wort properties to variables in a process according to this invention.

The best combination of those properties attributable to protein breakdown is obtained in a proteolytic reaction period conducted at 46° C. for 50 to 60 minutes as illustrated by the graph of FIG. 12 in which formol nitrogen content and attenuation are plotted against temperature.

EXAMPLE 12

This example illustrates the effects of varying temperature and time during the solubilization and saccharification of the barley, and shows the advantages of the stepwise heating procedure of the preferred embodiments of this invention.

Basically, the laboratory scale procedure of Example 6 hereinbefore was followed except that the enzyme complex of Example 1 was employed in the conversion and the temperature and time for the solubilization and saccharification in the mash cycle of FIG. 5 were varied as shown in Tables VIII and IX below. Pertinent wort properties are also summarized in these tables.

Single stage procedure
TABLE VIII

|  | Temperature (° C.) | | | | | |
|---|---|---|---|---|---|---|
|  | 62 | 62 | 62 | 71 | 76 | 80 |
| Time (minutes) | 90 | 60 | 30 | 60 | 60 | 30 |
| Wort extract (° P.) | 9.75 | 9.55 | 9.4 | 10.8 | 10.2 | 9.6 |
| Q.F | 2.2 | 2.1 | 2.2 | 3.4 | 3.2 | 2.95 |
| Formol nitrogen (mg./litre) | 210 | 189 | 172 | 179 | 185 | 193 |
| Attenuation (percent) | 77.4 | 78.0 | 76.6 | 68.5 | 68.6 | 69.3 |
| Yield (percent) | 86.5 | 84.6 | 83.3 | 96.2 | 90.7 | 85.1 |

TABLE IX

| Stage: | | | | | | | | | | | | | | | | |
|---|---|---|---|---|---|---|---|---|---|---|---|---|---|---|---|---|
| Primary: | | | | | | | | | | | | | | | | |
| Temperature (° C.) | 60 | | | | 60 | | | | 64 | | | | 68 | | | |
| Time (minutes) | 45 | | | | 60 | | | | 45 | | | | 35 | | | |
| Secondary: | | | | | | | | | | | | | | | | |
| Temperature (° C.) | 70 | 70 | 76 | 80 | 70 | 70 | 76 | 80 | 70 | 70 | 76 | 80 | 70 | 70 | 76 | 80 |
| Time (minutes) | 15 | 30 | 15 | 10 | 15 | 30 | 15 | 10 | 15 | 30 | 15 | 10 | 15 | 30 | 15 | 10 |
| Wort properties: | | | | | | | | | | | | | | | | |
| Wort extract (° P.) | 9.95 | 10.1 | 10.2 | 10.0 | 10.0 | 10.2 | 10.3 | 9.9 | 10.1 | 10.15 | 10.4 | 10.05 | 9.8 | 9.9 | 10.05 | 9.85 |
| Q.F | 2.5 | 2.4 | 2.3 | 2.45 | 2.5 | 2.4 | 2.25 | 2.4 | 2.4 | 2.25 | 2.15 | 2.3 | 2.5 | 2.4 | 2.25 | 2.0 |
| Formol nitrogen (mg./litre) | 184 | 183 | 186 | 183 | 188 | 194 | 198 | 196 | 189 | 192 | 194 | 191 | 178 | 179 | 191 | 185 |
| Attenuation (percent) | 73.9 | 75.2 | 77.5 | 75.5 | 75.0 | 76.5 | 78.1 | 75.8 | 76.2 | 76.8 | 79.3 | 77.1 | 74.5 | 75.6 | 76.6 | 79.7 |
| Yield (percent) | 88.4 | 89.7 | 90.7 | 88.8 | 88.8 | 90.7 | 91.6 | 87.9 | 89.7 | 90.2 | 92.5 | 89.2 | 86.9 | 87.9 | 89.2 | 87.4 |

A comparison of the data presented in Tables VIII and IX shows the advantages of the two stage, step-wise heating procedure in giving worts of superior extract, Q.F., formol nitrogen and attenuation values relative to the single stage procedure involving comparable temperatures and times. For instance, heating at 76° C. for 60 minutes in the single stage procedure gives a wort extract, Q.F., formol nitrogen and attenuation of 10.2, 3.2, 185 and 68.7% respectively compared to 10.4, 2.15, 194, and 79.3% for the two stage procedure with 45 minutes at 64° C. and 15 minutes at 76° C.

EXAMPLE 13

This example illustrates the effect upon wort properties of varying the amount of adjunct included in the mash bill.

Basically, the procedure and mash bill of Example 6 were followed except that the enzyme complex of Example 1 was used and the amount of corn grits incorporated as adjunct was varied as shown in Table X which follows. This table also summarizes the data obtained from the wort analysis.

TABLE X

| Corn (percent by weight) barley | 11 | 12 | 30 | 44 | 53 | 55.8 | 58 | 60 | 70 |
|---|---|---|---|---|---|---|---|---|---|
| Barley:corn | 90:10 | 89.3:10.7 | 77:23 | 69.5:30.5 | 65.2:34.8 | 64:36 | 63.3:36.7 | 62.5:37.5 | 58.8:41.2 |
| Wort extract (° P.) | 10.4 | 10.4 | 10.4 | 10.4 | 10.6 | 10.6 | 10.5 | 10.6 | 10.6 |
| Q.F | 2.9 | 2.65 | 2.6 | 2.4 | 2.3 | 2.3 | 2.3 | 2.3 | 2.35 |
| Formol nitrogen (mg./litre) | 231 | 222 | 214 | 195 | 192 | 186 | 185 | 186 | 185 |
| Attenuation (percent) | 72.1 | 74.5 | 74.9 | 75.4 | 78.3 | 78.3 | 78.2 | 78.3 | 78.0 |

Figure 13:
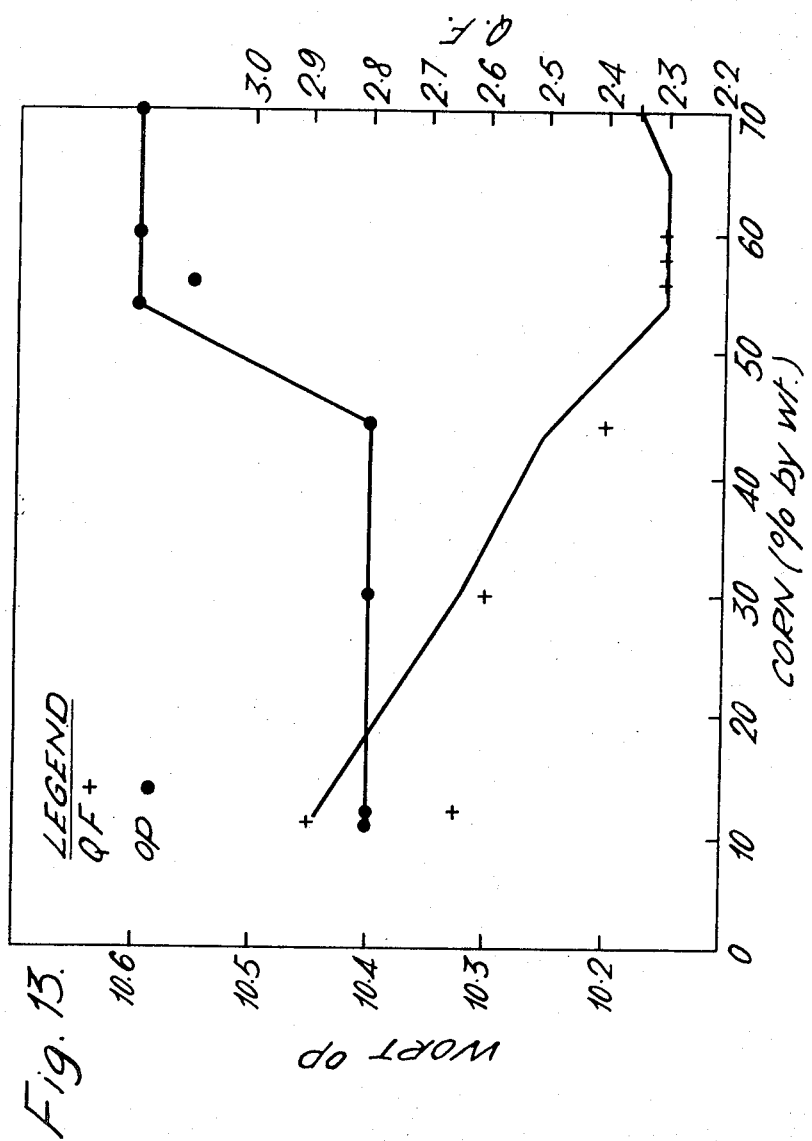

From the graphs of FIGS. 13 and 14 which illustrate certain features of these results, it will be noted that the best compromise between the various properties is obtained by working at adjunct levels between 44 and 60% by weight based on the weight of the barley.

EXAMPLE 14

The procedure of the foregoing example was repeated except that different adjuncts were used as summarized in the following Table XI which also includes data obtained from analyses of the wort so-obtained.

TABLE XI

|  | Adjunct of— | | | | | | | | | | | |
|---|---|---|---|---|---|---|---|---|---|---|---|---|
|  | Corn starch (prepared adjunct) | | | | Wheat starch | | | | Barley flour | | | |
| Percent by weight of barley | 12 | 44 | 53 | 58 | 12 | 44 | 53 | 58 | 12 | 44 | 53 | 58 |
| Wort extract (° P.) | 10.2 | 11.0 | 11.1 | 11.1 | 10.3 | 10.3 | 10.25 | 10.5 | 10.15 | 9.9 | 9.9 | 9.95 |
| Q.F | 2.65 | 2.45 | 2.35 | 2.35 | 2.5 | 2.35 | 2.3 | 2.2 | 2.95 | 2.45 | 2.45 | 2.45 |
| Formol nitrogen (mg./litre) | 232 | 202 | 195 | 182 | 225 | 192 | 187 | 180 | 234 | 200 | 195 | 196 |
| Attenuation | 74.0 | 77.7 | 78.8 | 78.8 | 75.7 | 77.2 | 77.6 | 79.0 | 70.9 | 74.3 | 74.3 | 74.5 |

EXAMPLE 15

A brewers' wort was prepared following the procedure of Example 6 hereinbefore from a mash bill comprising:

| | |
|---|---|
| Barley | gms 11,305 |
| Malt | gms 1,135 |
| Corn | gms 5,540 |
| Water | litres 40 |
| Sodium chloride | gms 18 |
| Calcium acetate | gms 9 | using an enzyme complex derived from *B. subtilis* ATCC21556 (by a procedure similar to that of Example 1) at a level of 150 amylase units and 1.05 protease units per gm. barley.

The wort so-obtained, which had an extract value of 10.8° P., was divided into two portions.

One of these portions was boiled in an open kettle for 2 hours, at the end of which period it had an extract value of 12.8° P. The boiled wort was cooled then evaporated in a film evaporator of the climbing film type under reduced pressure to a solids content of about 75%. The resulting concentrate was a thick, easy to handle syrup with a formol nitrogen content of 299 mg./litre. This syrup diluted to 11° P. value, i.e. 11% solids, gave a reconstituted wort with acceptable properties for fermentation into beer.

The other portion of the wort was dried to powder using a spray drier ("Niro" type) operating at an air inlet temperature of 115° C. and an air outlet temperature of 70° C. The product was water soluble and could be dispersed in water, bittered with hops or powdered sodium isohumulate, and pitched with yeast, then fermented in the usual way to give a beer.

Although the present invention has been illustrated with preferred embodiments, it will be understood that modifications and variations may be employed without departing from the spirit and scope of this invention, as those skilled in the art will readily understand. Such variations and modifications are therefore considered to be within the purview and scope of the appended claims.

What is claimed is:

1. In a process for the production of a brewers' wort in which an aqueous mash of unmalted cereal grains and malt or malt extract is subjected to the action of enzymes whereby proteins present in the unmalted cereal grains are converted into soluble nitrogen-containing compounds and carbohydrates present in the cereal grains are solubilized and converted by saccharification into sugars after which the resulting mash is filtered, the improvement of enhancing the filterability of the mash comprising:
    (A) using up to 30 percent by weight of malt or malt extract;
    (B) using a discrete protease enzyme in an amount of between about 0.5 to about 3.0 modified Kunitz protease units per gram of unmalted cereal grains;
    (C) using a discrete α-amylase enzyme in an amount of between about 80 to about 250 modified Stein-Fischer α-amylase units per gram of unmalted cereal grains;
    (D) selecting and controlling the ratio of α-amylase to protease enzymes on an activity basis so that it is less than 200:1; and
    (E) subjecting the aqueous mash to a sequence of process steps involving:
        (i) maintaining the mash at a temperature of between about 40° and about 55° C. for a period of between about 30 and about 120 minutes;
        (ii) raising the temperature of the mash to between about 60° and about 80° C.;
        (iii) maintaining the temperature of the mash at between about 60° and about 80° C. for a period of between about 30 and about 120 minutes; and
        (iv) separating the wort so-obtained from the solid material.

2. A process as claimed in claim 1, wherein said discrete protease and amylase enzymes are derived from a fermentation of *Bacillus subtilis, Bacillus amyloliquefaciens, Bacillus polymyxa, Bacillus coagulans, Bacillus cereus* or *Bacillus megaterium*.

3. A process as claimed in claim 1, wherein the discrete protease and α-amylase enzymes and the malt or malt extract are added to the mash at the beginning of or during step (i).

4. A process as claimed in claim 1, wherein the discrete protease enzyme and malt or malt extract are added to the mash prior to step (ii) and the discrete α-amylase enzyme is added prior to step (iii).

5. A process as claimed in claim 1, wherein the discrete protease enzyme and malt or malt extract are added to the mash at the beginning of step (i) and the discrete α-amylase enzyme is added at the beginning of step (iii).

6. A process as claimed in claim 1, wherein the discrete protease enzyme is added to the mash at the beginning of step (i) and the discrete α-amylase enzyme and malt or malt extract are added at the beginning of step (ii).

7. A process as claimed in claim 1, wherein the discrete protease enzyme is added to the mash at the beginning of step (i) and the discrete α-amylase enzyme and malt or malt extract are added at the beginning of step (iii).

8. A process as claimed in claim 1, wherein, prior to the separation step, the temperature of the mash is briefly raised to a temperature over 80° C. to substantially inactivate the enzymes.

9. A process as claimed in claim 1, wherein an adjunct is introduced into the mash in an amount of between about 10 and about 60 percent by weight of the unmalted cereal grains.

10. Process as claimed in claim 9, wherein the adjunct is introduced before step (iii).

11. A process as claimed in claim 9, wherein the adjunct comprises a liquefied raw cereal grain selected from liquefied corn grits, corn meal, sorghum, wheat flour, rice, corn starch, barley flour or rice meal.

12. A process as claimed in claim 9, wherein the adjunct is a material selected from pre-gelatinized corn flakes, corn syrup and glucose.

13. A process as claimed in claim 1, wherein step (iii) is effected in a two-stage procedure wherein the mash is (a) initially held at a temperature between about 64° and about 70° C. for a period between about 35 and about 60 minutes; (b) subsequently heated to a temperature between about 70° and about 80° C. and held at said temperature for a period between about 10 and about 30 minutes.

14. A process as claimed in claim 1, wherein malt is used in an amount of between about 8 and about 20 percent by weight of the unmalted cereal grains, the discrete protease is present in an amount of between about 0.5 and about 3 modified Kunitz units per gm., the discrete α-amylase is present in an amount of between about 100 and about 250 modified Stein-Fischer α-amylase units per gm. and the ratio of α-amylase to protease, on an activity basis, is in the range between about 170:1 and 75:1.

15. A process as claimed in claim 1, wherein the steps comprise:
    (i) commingling an aqueous slurry of unmalted cereal grains with malt or malt extract, discrete protease and discrete α-amylase wherein the malt is used in an amount between about 8 and about 20 percent by weight of unmalted cereal grains, the protease is present in an amount of at least 0.9 modified Kunitz protease units per gram unmalted cereal grains and the α-amylase is present in an amount of at least 100 modified Stein-Fischer α-amylase units per gram unmalted cereal grains wherein further the ratio of α-amylase to protease, on an activity basis, is less than 200:1;

(ii) with the pH of the resulting mixture between about 5.0 and about 6.5 holding the temperature of the mixture between about 40° and about 55° C. for a period between about 30 and about 120 minutes;

(iii) introducing into the mixture an adjunct in an amount between about 10 and about 60 percent by weight of unmalted cereal grains of step (i);

(iv) heating the resultant mash to a temperature between about 64° and about 68° C. and maintaining the temperature for a period between about 35 and about 60 minutes;

(v) heating the mash further to a temperature between about 74° and about 78° C. and maintaining the temperature for a period between about 10 and about 30 minutes;

(vi) heating the mash to a temperature high enough to substantially inactivate the enzymes; and (vii) separating the wort so-obtained from the solid material.

16. Process for the production of beer or the like alcoholic beverage, wherein the wort obtained by the process of claim 1 after the addition of bittering adjuncts, is subjected to alcoholic fermentation.

References Cited

UNITED STATES PATENTS

| | | | |
|---|---|---|---|
| 2,442,806 | 6/1948 | Gluek | 99—51 X |
| 2,790,718 | 4/1957 | Nugey | 99—52 X |
| 2,951,762 | 9/1960 | Nugey | 99—51 |
| 2,970,054 | 1/1961 | Nugey | 99—51 |
| 3,081,172 | 3/1963 | Dennis et al. | 99—51 |
| 3,353,960 | 11/1967 | Bavisotto | 99—52 |

FOREIGN PATENTS 977,592   12/1964   Great Britain.

JOSEPH M. GOLIAN, Primary Examiner

U.S. Cl. X.R.

99—52